United States Patent [19]
Yamada

[11] Patent Number: 4,747,080
[45] Date of Patent: May 24, 1988

[54] SEMICONDUCTOR MEMORY HAVING SELF CORRECTION FUNCTION

[75] Inventor: Junzo Yamada, Atsugi, Japan

[73] Assignee: Nippon Telegraph & Telephone Corporation, Tokyo, Japan

[21] Appl. No.: 926,699

[22] Filed: Nov. 3, 1986

[51] Int. Cl.$^4$ .................. G11C 13/00; G11C 11/40
[52] U.S. Cl. .................................. 365/200; 365/210; 371/50
[58] Field of Search ............... 365/189, 200, 201, 210, 365/207; 371/48, 49, 50

[56] References Cited

U.S. PATENT DOCUMENTS 4,456,980 6/1984 Yamada et al. ..................... 365/200

*Primary Examiner*—Terrell W. Fears
*Attorney, Agent, or Firm*—Townsend & Townsend

[57] ABSTRACT

A semiconductor memory having a self correction function, includes: a plurality of memory cells which are divided into a plurality of area groups, store data, and are arranged in a matrix; a plurality of parity cells, associated with the area groups of the memory cells, for forming horizontal and vertical parity codes together with the data in the memory cells of the respective area groups; word lines for simultaneously selecting the plurality of memory cells and the parity cells; bit lines for exchanging data with the memory cells; parity bit lines for exchanging parity bit data with the parity cells; selectors for selecting data of the memory cells and data of the parity cell in the area group to which a memory cell to be checked belongs; means for performing parity check of a plurality of data from the selectors; and means for automatically correcting a bit error using the output from the parity check means. The memory cells divided into the area groups and the parity cells combined therewith are arranged so as not to belong to the same horizontal and vertical arrays of the matrix.

14 Claims, 22 Drawing Sheets

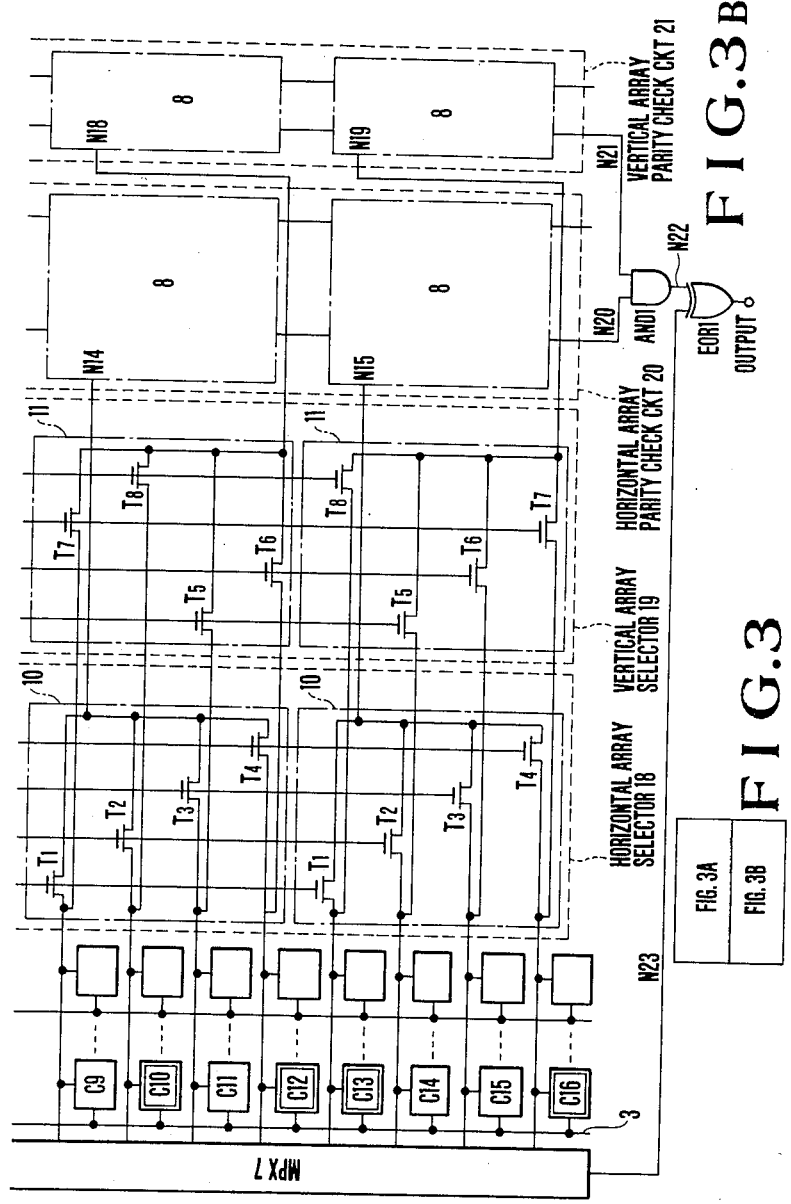

| C1 | C7 | C13 | C19 | C25 | C31 |
|----|----|-----|-----|-----|-----|
| C32 | C2 | C8 | C14 | C20 | C26 |
| C27 | C33 | C3 | C9 | C15 | C21 |
| C22 | C28 | C34 | C4 | C10 | C16 |
| C17 | C23 | C29 | C35 | C5 | C11 |
| C12 | C18 | C24 | C30 | C36 | C6 |
FIG. 4A
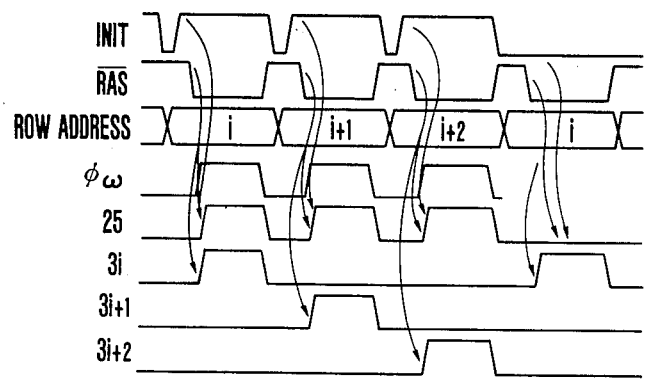
FIG. 8
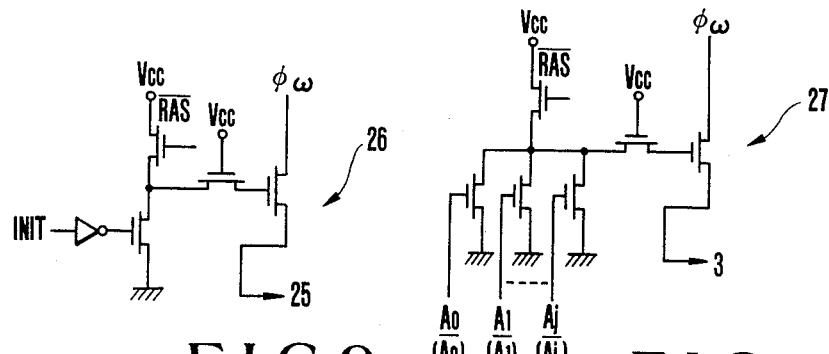
FIG. 9  FIG. 10

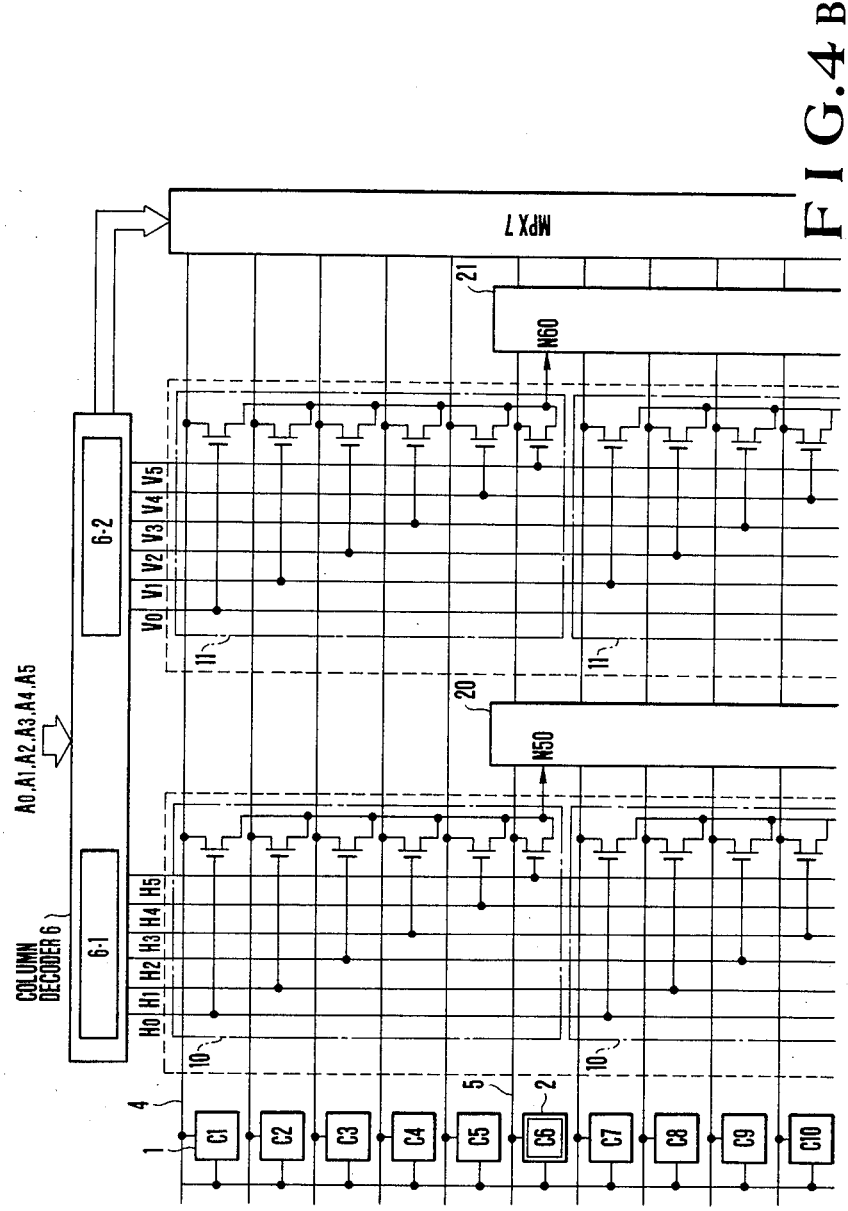

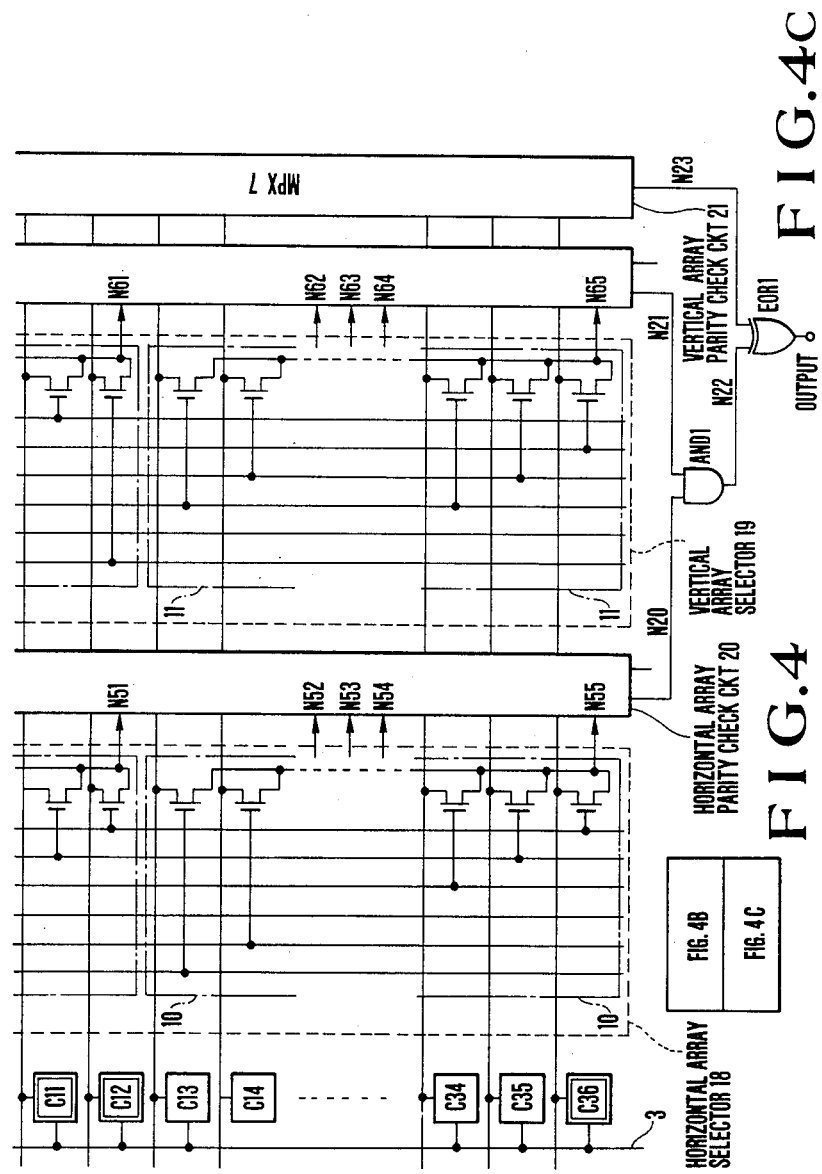

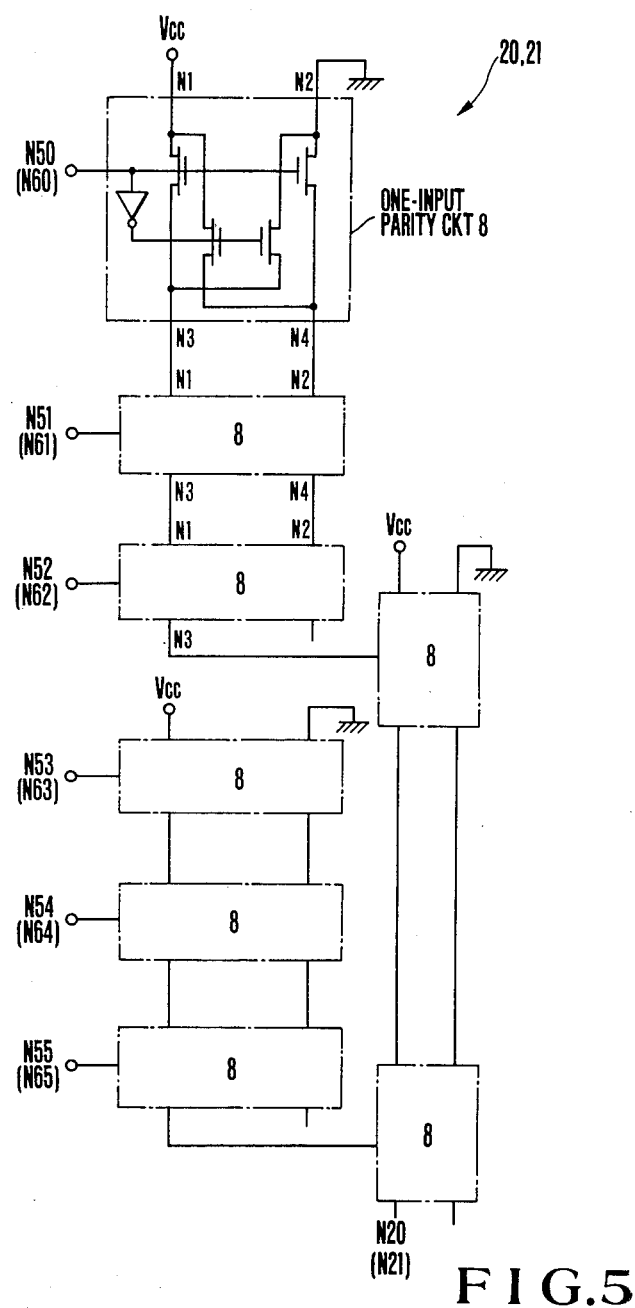
F I G. 5

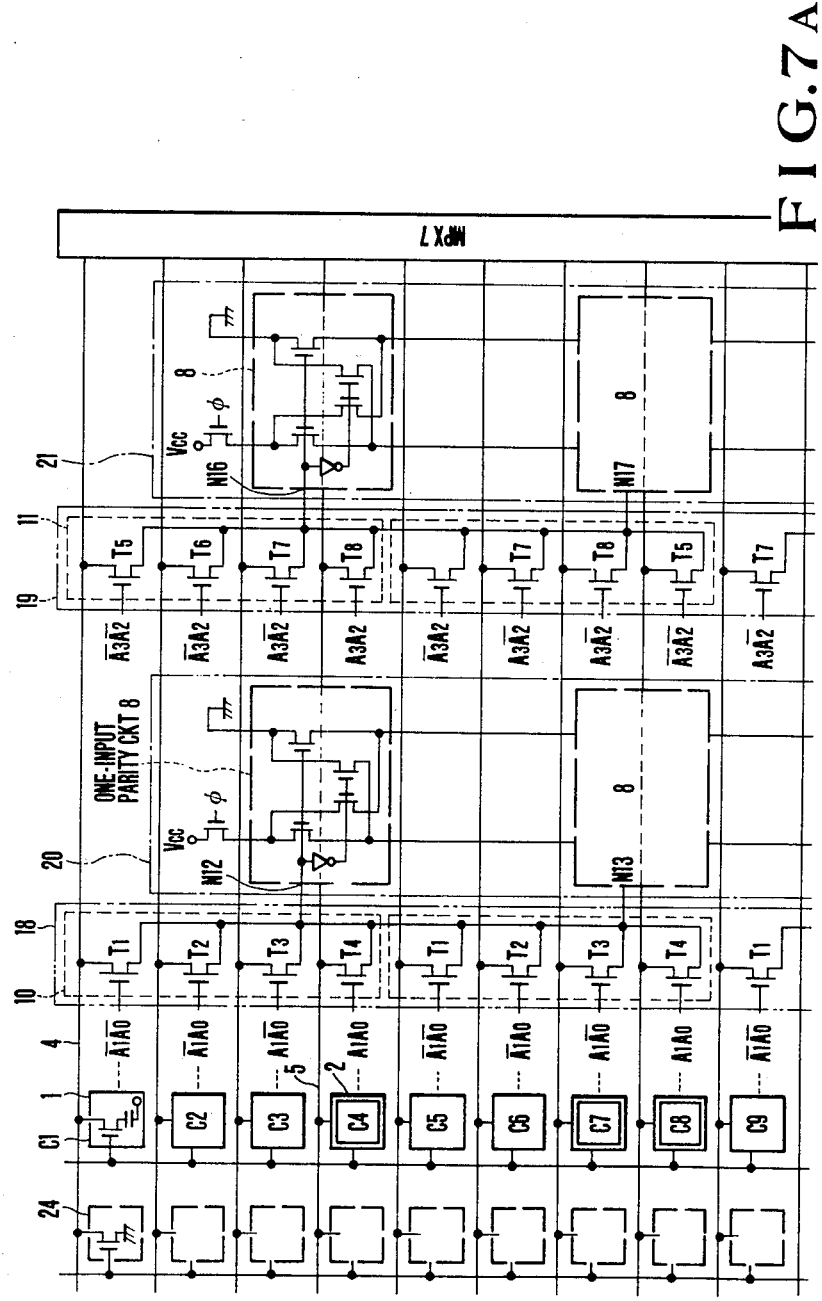

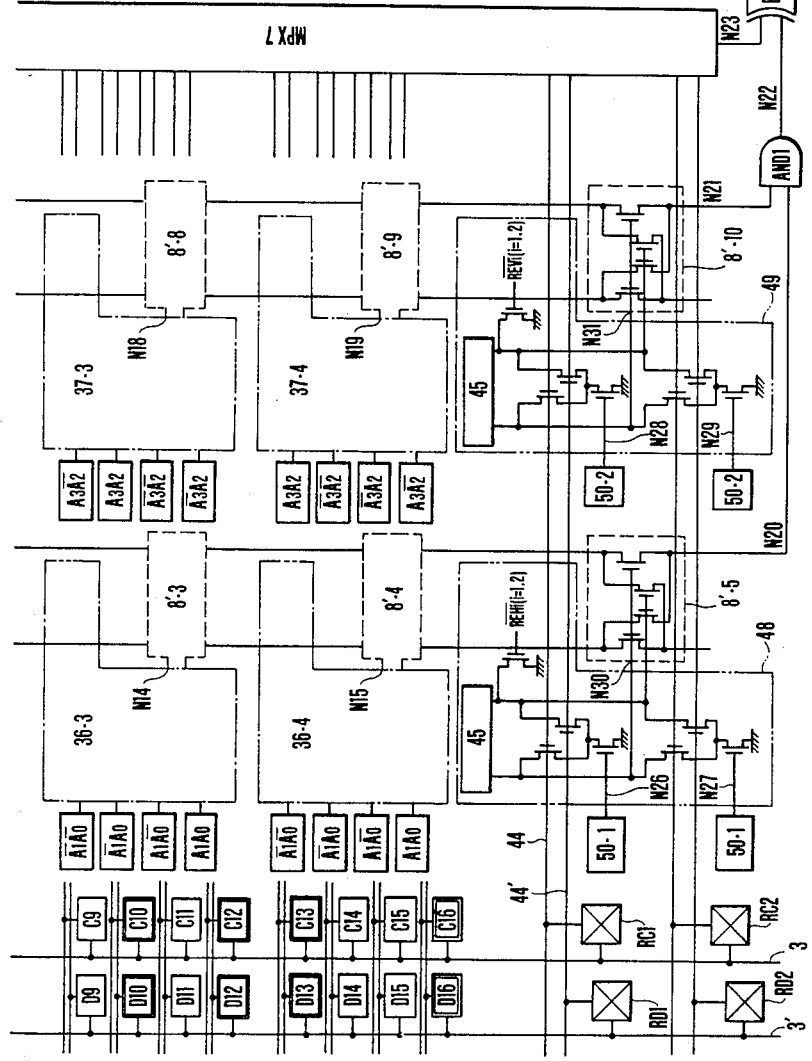

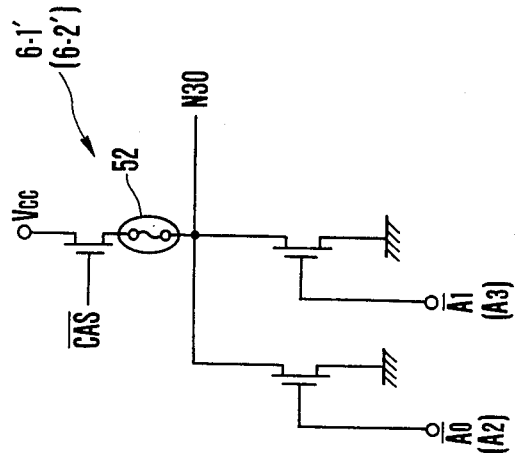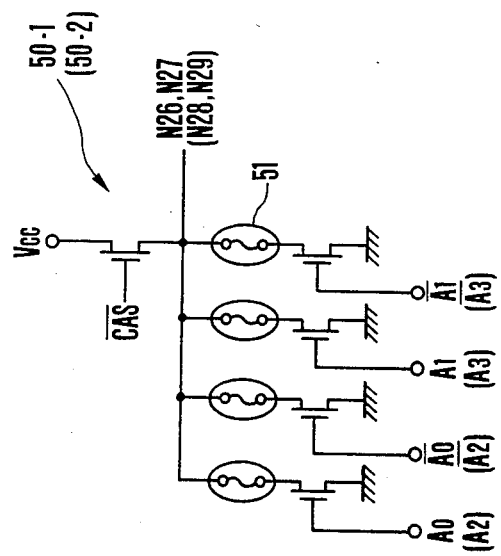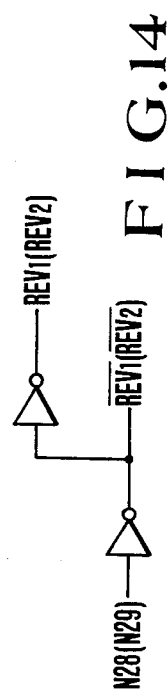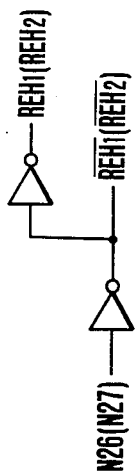
FIG. 13
FIG. 14
FIG. 12

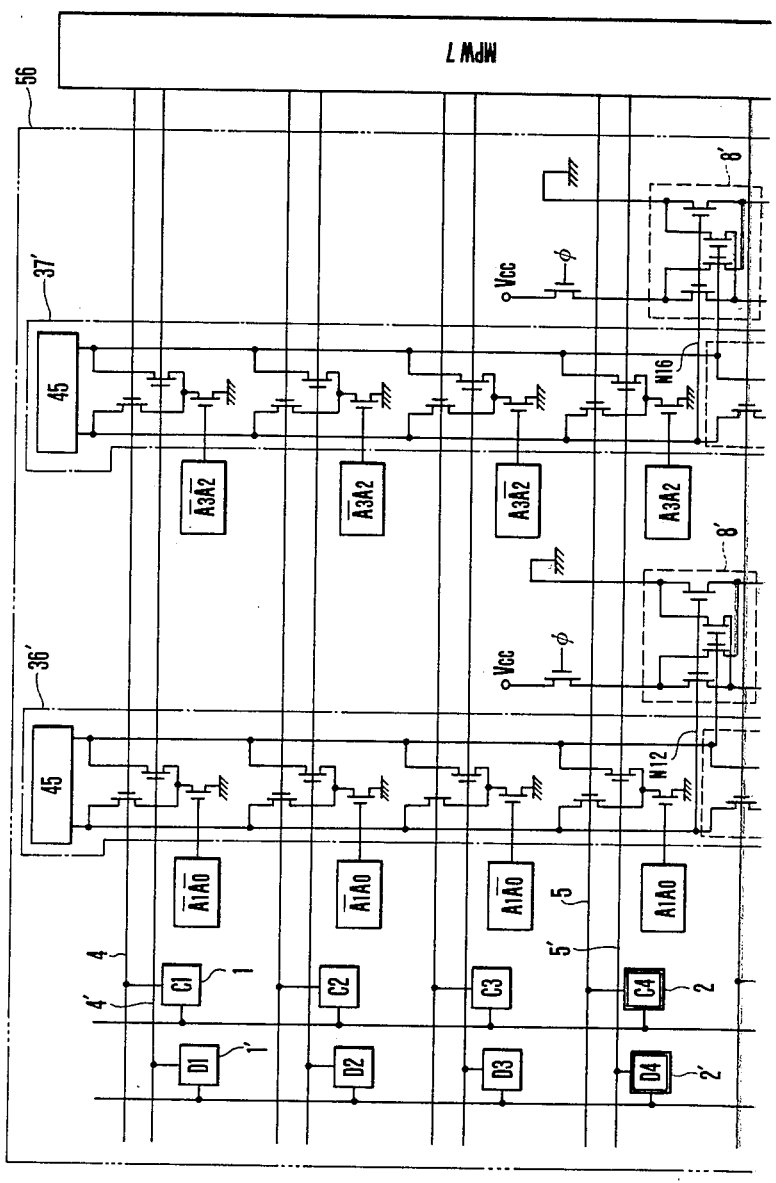

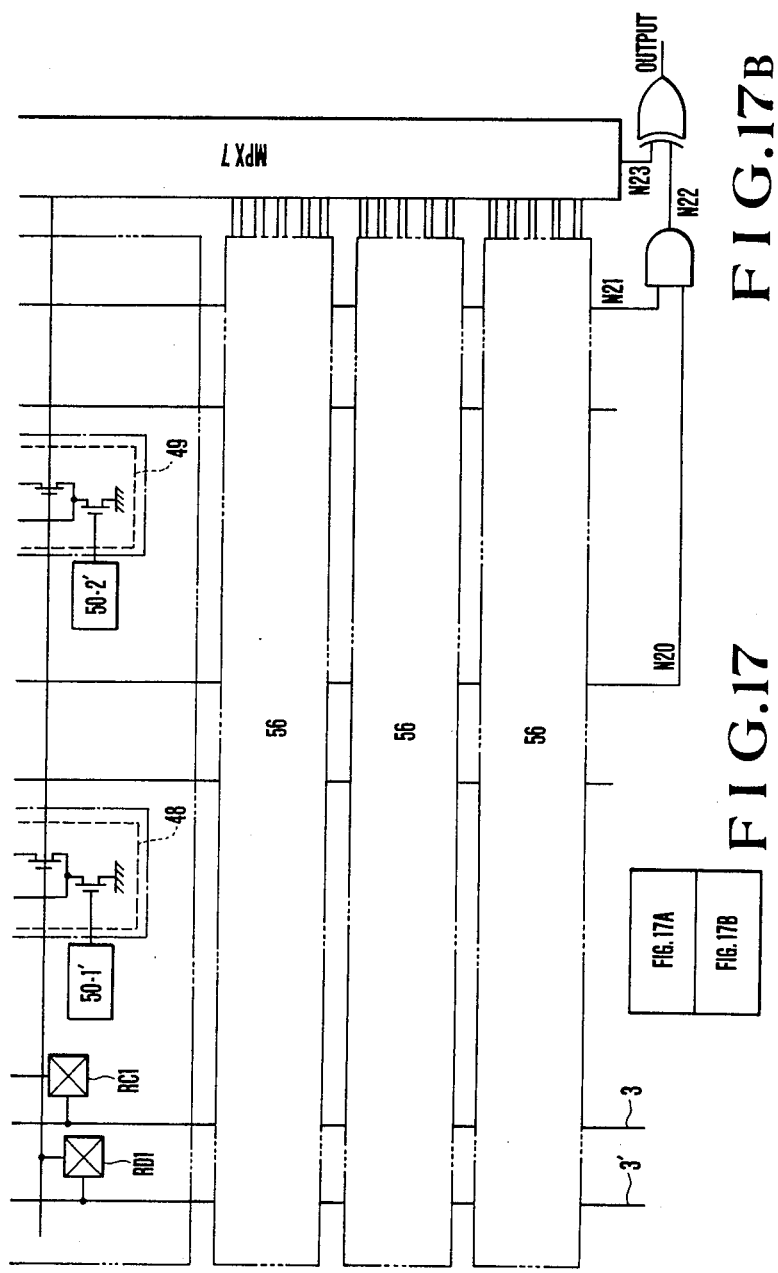

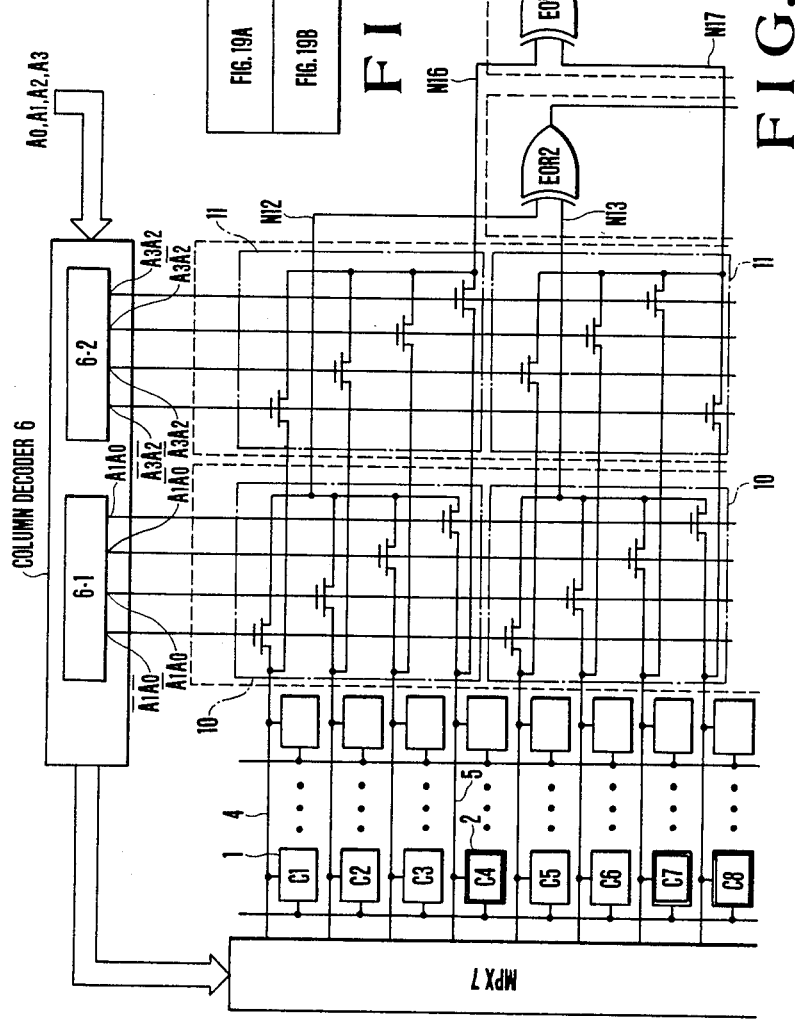

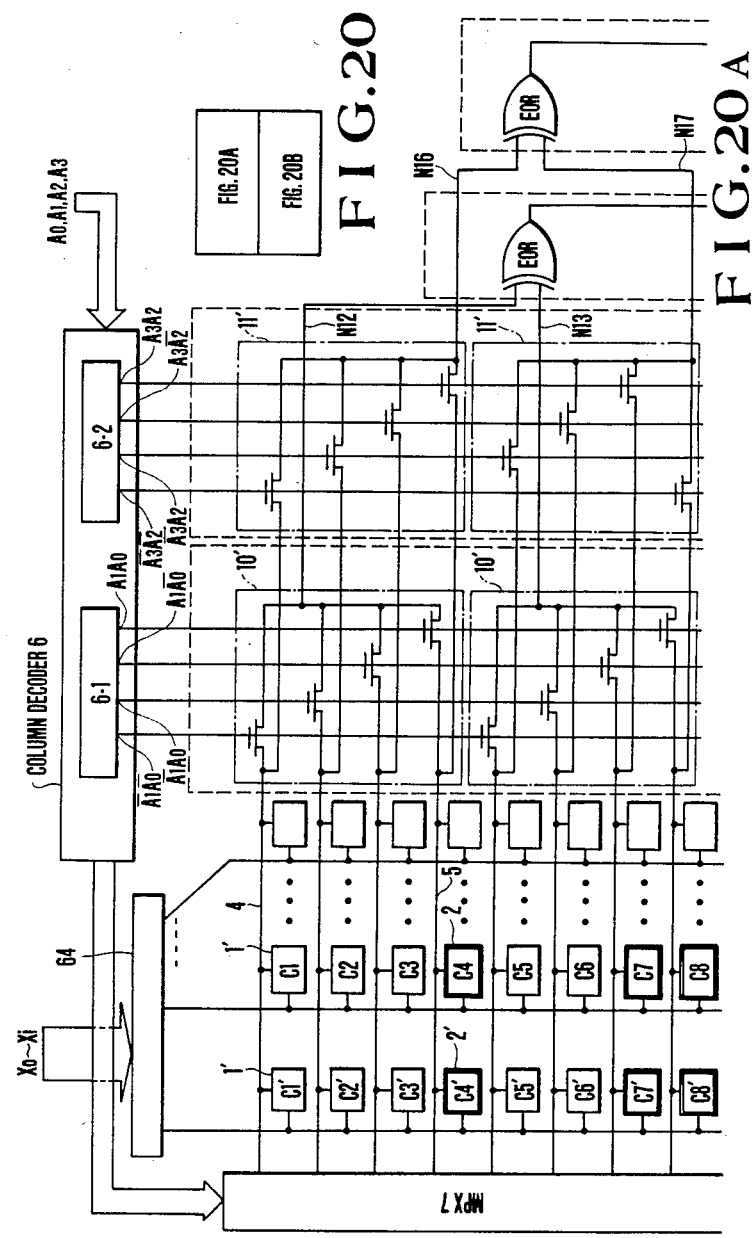

SEMICONDUCTOR MEMORY HAVING SELF CORRECTION FUNCTION

The present invention relates to a semiconductor memory having a function for automatically correcting a bit error inside the memory.

In a known semiconductor memory having a function for correcting a bit error inside the memory, horizontal and vertical parity codes are used for a plurality of memory cells connected to a single word line. Memory cells on an identical word line and a required number of parity cells added thereto are aligned in a two-dimensional logic space, and parity data is stored to establish even parity both in horizontal and vertical arrays. Error correction is executed by a correction signal obtained by ANDing parities of a pair of horizontal and vertical arrays to which an output bit belongs. As described in, e.g., U.S. Pat. No. 4,456,980 (patented on June 26, 1984), the semiconductor memory having the self correction function according to the above technique basically comprises a cell matrix array including parity cells, a multiplexer for deriving an output from the cell matrix array, a selector for selecting horizontal and vertical arrays to which an output bit belongs, a pair of parity check circuits for checking parities of the horizontal and vertical arrays, and a correction circuit for correcting the multiplexer output using an AND signal of the outputs from the parity check circuits. The memory normally has a plurality of word lines.

In the semiconductor memory having the self correction function with the above arrangement, however, one-input parity circuits constituting the parity check circuits for the horizontal and vertical arrays must be provided for respective bit lines forming horizontal and vertical arrays. However, when the one-input parity circuits are to be provided in correspondence with the respective bit lines, they cannot be arranged inside the cell matrix array and must be inevitably arranged around the cell matrix array since the horizontal or vertical arrays are selected from all the regions to be input to the one-input parity circuits. For this reason, as the capacity of the memory increases, wirings extending from each bit line to the one-input parity circuits are prolonged, thus restricting memory minituarization and margin of circuit design. In addition, as the memory capacity increases, a pitch between adjacent bit lines decreases. Therefore, if the above arrangement is applied to a Mbit-class RAM, the layout of the one-input parity circuits poses a serious problem. In the known semiconductor memory having the self correction function, since a horizontal array selection switch is interposed between the cell matrix array and the multiplexer and the wiring lengths between bit lines and the one-input parity circuits are different from each other and are also long, the operation speeds of the horizontal and vertical parity check operations are imbalanced, thus preventing high-speed error correction. In addition, since parity check is performed using the selector output externally read out from the cell matrix array during the operation of the memory, the operation time after the parity check circuits corresponds to an increment of the access time of the memory, again preventing the high-speed operation.

SUMMARY OF THE INVENTION

It is therefore a principal object of the present invention to provide a semiconductor memory having a self correction function in which wiring lengths between the respective bit lines and parity circuits are shortened to realize a semiconductor memory which is smaller and has a higher operation speed than the conventional semiconductor memory.

It is another object of the present invention to provide a semiconductor memory having a self correction function, which can improve margin of the memory circuit design compared to the conventional semiconductor memory.

It is still another object of the present invention to provide a semiconductor memory having a self correction function, in which the number of parity circuits is reduced as compared to a conventional memory to solve the problem of layout for the parity check circuits.

It is still another object of the present invention to provide a semiconductor memory having a self correction function which can shorten a signal access time after readout from a cell matrix array compared to the conventional semiconductor memory.

In order to achieve the above objects of the present invention, adjacent cells connected to each word line are divided into a plurality of area groups for each predetermined number of cells, so that the individual cells in each area group belong to different horizontal and vertical arrays. With this grouping, a selector can select one cell from each area group to constitute the horizontal and vertical arrays. Parity circuits are connected to the output of the selector. If an error occurs, readout cell data is corrected using the outputs from the parity check circuits.

Therefore, according to an aspect of the present invention, there is provided a semiconductor memory having a self correction function, comprising: a plurality of memory cells which are divided into a plurality of area groups, store data, and are arranged in a matrix; a plurality of parity cells, associated with the area groups of the memory cells, for forming horizontal and vertical parity codes together with the data in the memory cells of the respective area groups of the memory cells; word lines for simultaneously selecting the plurality of memory cells and the parity cells; bit lines for exchanging data with the memory cells; parity bit lines for exchanging parity bit data with the parity cells; selectors for selecting data of the memory cells and parity data of the parity cell in the area group to which a memory cell to be checked belongs; means for performing parity check of a plurality of data from the selectors; and means for automatically correcting a bit error using the output from the parity check means, wherein the memory cells divided into the area groups and the parity cells combined therewith are arranged so as not to belong to the same horizontal and vertical arrays of the matrix.

BRIEF DESCRIPTION OF THE DRAWINGS

FIG. 4 (4B and 4C) is a circuit diagram showing another embodiment of the present invention;

FIG. 4A is a circuit diagram showing the relationship between area groups of memory cells and parity cells, and the horizontal and vertical arrays in the embodiment shown in FIG. 4;

FIGS. 5 and 6 are diagrams showing the detailed arrangements of parity check circuits for horizontal and vertical arrays shown in FIG. 4;

FIG. 8 is a timing chart for explaining the operation timings in FIG. 7;

FIGS. 9 and 10 are circuit diagrams showing a detailed initial setting circuit shown in FIG. 7;

FIGS. 12 and 13 are circuit diagrams showing a detailed column decoder shown in FIG. 11;

FIG. 14 is a circuit diagram showing an error separation signal and surplus selector activation signal generator in FIG. 11;

FIG. 17 (17A and 17B) is a circuit diagram showing still another embodiment of the present invention.

DETAILED DESCRIPTION OF THE PREFERRED EMBODIMENTS

Figure 1B:
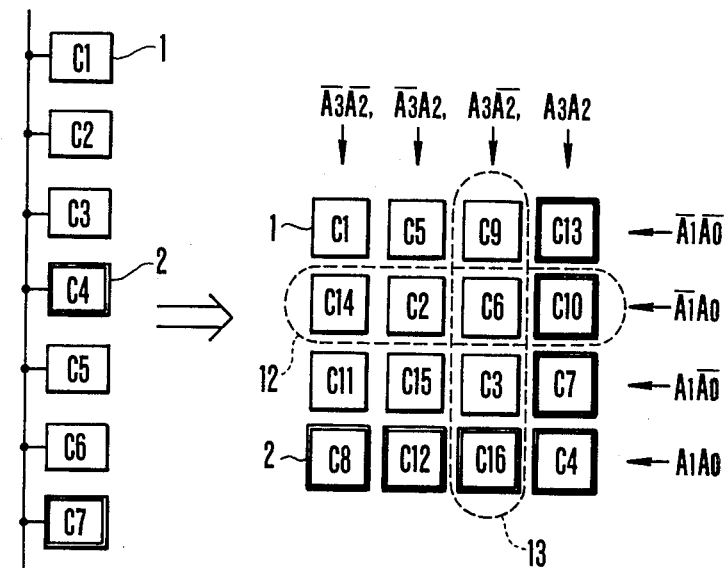
FIGS. 1A and 1B are diagrams for explaining the operation principle of the present invention.
Figures 1A, 2:
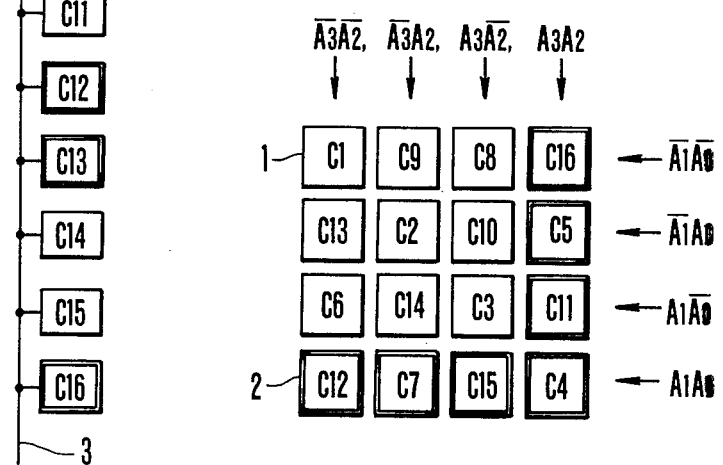
FIG. 2 is a diagram for explaining an embodiment of the present invention.

FIGS. 1A and 1B are for explaining the operation principle of the present invention. FIG. 1A shows a state wherein nine memory cells 1 and seven parity cells 2, i.e., a total of 16 cells, are connected to a single word line 3, and the respective cells are denoted by C1 to C16 from the upper cells in FIG. 1A in accordance with their physical positions. The parity cells 2 are distinguished from other cells by double frames. Therefore, C4, C7, C8, C10, C12, C13, and C16 are parity cells, and the remaining cells are memory cells. FIG. 1B shows a state wherein 16 cells in FIG. 1A are developed in a two-dimensional address space to allow easy understanding of identical horizontal and vertical arrays. This developing method is the key to the present invention. Referring to FIG. 1B, in area groups each including physically adjacent four cells in FIG. 1A, i.e., C1 to C4, C5 to C8, C9 to C12, and C13 to C16, four cells in the same area group belong to different horizontal and vertical arrays. In other words, 16 cells are arranged in a 4×4 matrix. The cells C1 to C4 in the first area group are arranged along a diagonal line extending from the upper left corner to the lower right corner of the matrix. The cells C5, C6, and C7 of the cells C5 to C8 in the second area group are arranged above the diagonal line, and the remaining cell C8 is arranged at the lower left corner. Of the cell C9 to C12 in the third area group, the cells C9 and C10 are arranged at the upper right side of the cells C5, C6, and C7, and the remaining cells C11 and C12 are arranged adjacent to the cell C8 and parallel to the diagonal line to be inclined downward toward the right. Of the cells in the fourth area group, the cell C13 is arranged at the upper right corner, and the remaining cells C14, C15, and C16 are arranged between the cells C1 to C4 in the first area group arranged along the diagonal line and the cells C11 and C12 in the third area group to be parallel to the diagonal line and to be inclined downward toward the right.

When the horizontal and vertical arrays are constituted by the above-mentioned cell matrix, a horizontal or vertical array to which a cell to be corrected belongs can be selected by selecting one cell data from each of the area groups C1 to C4, C5 to C8, C9 to C12, and C13 to C16. For example, if cell data in the cell C6 shown in FIG. 1B is to be corrected, a horizontal array indicated by reference numeral 12, i.e., the cells C14, C2, C6, and C10, and a vertical array indicated by reference numeral 13, i.e., the cells C9, C6, C3, and C16, are selected. In this case, since these cells to be selected are respectively present in the above-mentioned four area groups, horizontal and vertical array selection switches can have the same structure.

FIG. 2 shows another developing method allowing the present invention, in which the cells in each of area groups C1 to C4, C5 to C8, C9 to C12, and C13 to C16 belong to different vertical and horizontal arrays in the same manner as in FIG. 1B. In this case, the cells C4, C5, C7, C11, C12, C15, and C16 are parity cells, and are arranged to be different from the parity cells in FIG. 1A, i.e., cells C4, C7, C8, C10, C12, C13, and C16. More specifically, 16 cells are arranged in a 4×4 matrix, and the cells C1 to C4 in the first area group are arranged along a diagonal line extending from the upper left corner to the lower right corner of the matrix. The cells C9, C10, and C11 in the cells C9 to C12 of the third area group are arranged adjacent to the upper side of the diagonal line, and the remaining cell C12 is arranged at the lower left corner. The cells C8 and C5 of the cells C5 to C8 in the second area group are arranged at the upper right side of the cells C9, C10, and C11, and the remaining cells C6 and C7 are arranged adjacent to the cell C12 to be parallel to the diagonal line and to be inclined downward toward the right. In the fourth area group, the cell C16 is arranged at the upper right corner, and the remaining cells C13, C14, and C15 are arranged between the cells C1 to C4 in the first area group arranged along the diagonal line and the cells C6 and C7 in the second area group to be parallel to the diagonal line and to be inclined downward toward the right.

When horizontal and vertical arrays are constituted by the above-mentioned matrix, horizontal and vertical arrays to which a target cell to be corrected belongs can be selected by selecting one cell data from each of the area groups C1 to C4, C5 to C8, C9 to C12, and C13 to C16, in the same manner as in FIG. 1B.

The selection logic of the horizontal and vertical arrays allowing the present invention is not limited to the above cases, and various modifications may be easily made.

Figure 3A:
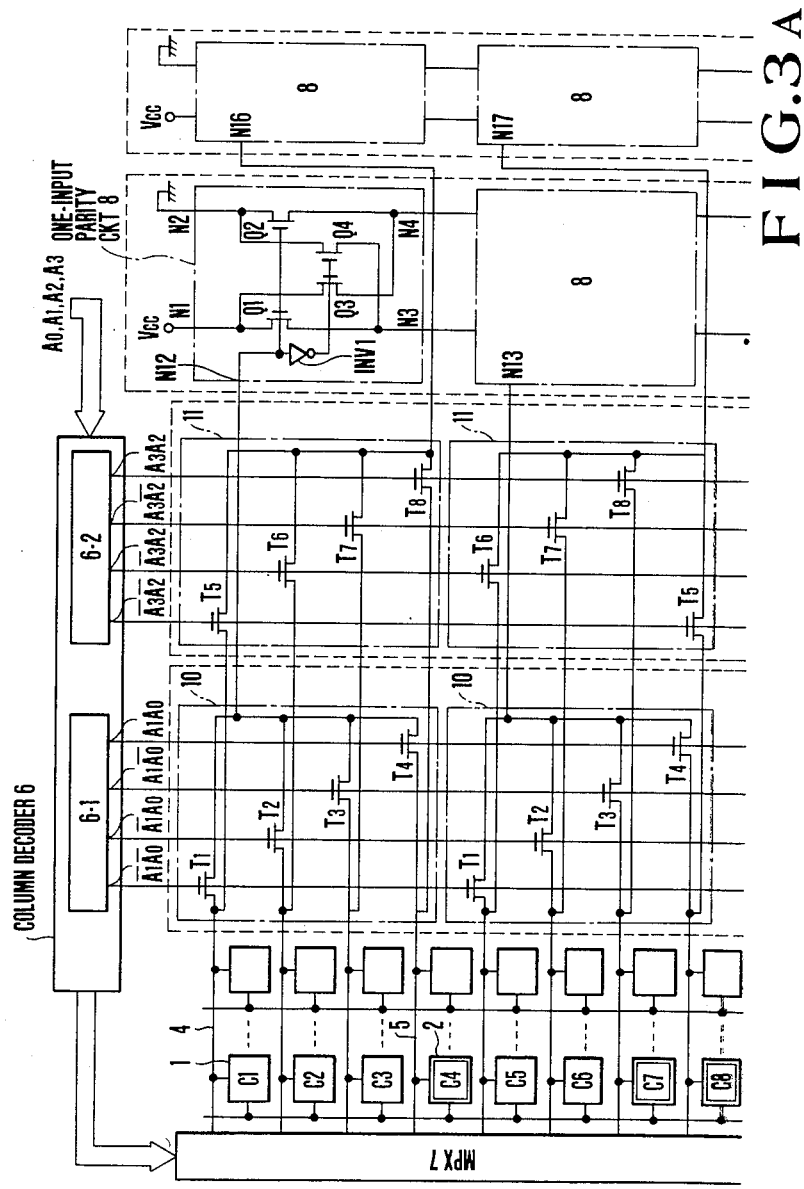
FIG. 3 (3A and 3B) is a detailed circuit diagram embodying the operation principle shown in FIG. 1.

FIG. 3 shows an embodiment of a semiconductor memory having a self correction function according to the present invention. Referring to FIG. 3, reference numeral 1 denotes memory cells; 2, parity cells for storing parity data of memory cell data; 3, word lines; 4, bit lines; 5, parity bit lines; 6, a column decoder; 6-1, a lower column decoder for receiving column addresses A0 and A1; and 6-2, an upper column decoder for receiving column addresses A2 and A3. Reference numeral 7 denotes a multiplexer; 8, one-input parity circuits for switching paths for transmitting two reference voltages "H" and "L" in accordance with input data; 10, horizontal array selection switches; and 11, vertical array selection switches. Reference symbol INV1 denotes an inverter; AND1, an AND gate; EOR1, an exclusive OR gate; Q1 to Q4, transistors; and T1 to T8, transistors constituting the horizontal and vertical array selection switches 10 and 11. In this embodiment, four vertical array selection switches 10 constitute a horizontal array selector 18, and four vertical array selection switches 11 constitute a vertical array selector 19. The four one-input parity circuits (transmission exclusive OR gates) 8 connected to the outputs of the respective horizontal array selection switches 10 are grouped to constitute a horizontal array parity check circuit 20, and the four one-input parity circuits 8 connected to the outputs of the respective vertical array selection switches 11 are grouped to constitute a vertical array parity check circuit 21.

Each one-input parity circuit 8 exchanges the connection relationship between nodes N1 and N2 and nodes N3 and N4 using the transistors Q1, Q2, Q3, and Q4 in accordance with an input signal and its complementary or inverted signal, and these circuits 8 are series-connected. One parity circuit 8 in which the output from the horizontal array selection switch 10 is supplied to a node N12 will be exemplified. The node N12 is connected to the gates of the transistors Q1 and Q2 and is also connected to the gates of the transistors Q3 and Q4 through the inverter INV1. One output electrodes of the transistors Q1 and Q3 are connected to a power supply terminal Vcc through the node N1, and the other output electrodes of the transistor Q1 and one output electrode of the transistor Q4 are connected to the corresponding node N1 of the next one-input parity circuit 8 having a node N13. The other output electrode of the transistor Q4 and one output electrode of the transistor Q2 are connected to a ground power supply terminal. The other output electrode of the transistor Q2 and one output electrode of the transistor Q3 are connected to the corresponding node N2 of the next one-input parity circuit 8 having the node N13. Therefore, when a signal supplied to the node N12 is at "H" level, the transistors Q1 and Q2 are turned on and connect the power supply voltage Vcc and the ground potential to the nodes N1 and N2 of the next one-input parity circuit 8 having the node N13. In contrast to this, when a signal supplied to the node N12 is at "L" level, the transistors Q3 and Q4 are turned on and connect the power supply voltage Vcc to the node N2 of the next one-input parity circuit 8 having the node N13 and the ground potential to the node N1 thereof.

Each horizontal array selection switch 10 of the horizontal array selector 18 has the transistors T1 to T4 in units of the above-mentioned area groups, so that the respective transistors are connected to the bit lines of the corresponding cells in the area group and their outputs are connected commonly to one one-input parity circuit 8. The respective transistors are sequentially selected in accordance with the output from the lower column decoder 6-1. For example, the bit lines connected to the cells C1, C5, C9, and C13 in the respective area groups are connected to the one output electrodes of the corresponding transistors T1. These transistors T1 are turned on by an $\overline{A1A0}$ output from the lower column decoder 6-1 and transmit the contents of the respective cells to the output side. The bit lines connected to the cells C2, C6, C10, and C14 in the respective area groups are connected to one output electrodes of the corresponding transistors T2. These transistors T2 are turned on by an $\overline{A1}A0$ output from the lower column decoder 6-1, and transmit the contents of the respective cells to the output side. Similarly, the transistors T3 and T4 of the respective horizontal array selection switches 10 transmit the contents of the corresponding cells to the output side through the bit lines.

The other output electrodes of the transistors T1 to T4 of each horizontal array selection switch 10 are commonly connected and are then connected to the nodes N12, N13, N14, and N15 of one one-input parity circuit 8, respectively.

The first vertical array selection switch 11 of the vertical array selector 19 has the transistors T5 to T8 in units of the above-mentioned area groups, so that the respective transistors are connected to the bit lines of the corresponding cells in the area group and their outputs are connected commonly to one one-input parity circuit 8. The respective transistors are sequentially selected by the output from the upper column decoder 6-2. For example, the bit line connected to the cell C1 in one area group is connected to one output electrode of the transistor T5. The transistor T5 is turned on by an $\overline{A3A2}$ output from the upper column decoder 6-2 and transmits the content of the corresponding cell to the output side. The bit line connected to the cell C2 of one area group is connected to one output electrode of the transistor T6. The transistor T6 is turned on by an $\overline{A3}A2$ output from the upper column decoder 6-2, and transmits the content of the corresponding cell to the output side. Similarly, the transistors T7 and T8 of the first vertical array selection switch 11 transmit the contents of the corresponding cells to the output side through the bit lines. The other output electrodes of the transistors T5 to T8 of each vertical array selection switch 11 are commonly connected and then are connected to nodes N16, N17, N18, and N19 of one one-input parity circuit 8, respectively. The second vertical array selection switch 11 after the first vertical array switch 11 receives the output from the upper column decoder 6-2 shifted by one bit since the physical positions of the cells corresponding to the transistors are shifted by one. The output from the upper column decoder 6-2 supplied to each of the following vertical array selection switches is also shifted by one bit with respect to the vertical array selection switch at the former stage.

With the above arrangement, the circuit operation will be described below with reference to a case wherein cell data in the cell C6 is to be corrected. The cell data in the cells C2, C10, and C14 belonging to the identical horizontal array to that of the cell C6 are selected by the transistors T2 of the respective horizontal array selection switches 10 in response to the $\overline{A1}A0$ output from the lower column decoder 6-1 and are transmitted to the corresponding nodes N12, N13, N14, and N15, respectively. Similarly, cell data in the cells C3, C9, and C16 belonging to the identical vertical array to that of the cell C6 are selected by the transistors T7 of the vertical array selection switches 11 in response to an $\overline{A3}A2$ output from the upper column decoder 6-2 and are transmitted to the nodes N16, N17, N18, and N19, respectively. Thereafter, horizontal array parity check and vertical array parity check are simultaneously performed in the series circuits of the one-input parity circuits 8. The output node N20 of the one-input parity circuit 8 at the final stage of the horizontal array parity check and the output node N21 of the one-input parity circuit 8 at the final stage of the vertical array parity check are supplied to the AND gate AND1, and the AND product therebetween is sent to the node N22. In accordance with the output from the AND gate AND1, data at an output node N23 of the multiplexer 7 is corrected by the exclusive OR gate EOR1, and is supplied to an output terminal. In this manner, the automatic correction operation is performed.

With this arrangement, the cells are divided into area groups, and one bit line corresponding to a cell in each area group is selected and is connected to the parity circuit. Therefore, the one-input parity circuits can be arranged adjacent to the selection switches and inside the column system circuit, thus shortening wirings between the bit lines and the parity circuits, and realizing a semiconductor memory which is smaller and has a higher speed than a conventional memory. Comparing the conventional arrangement with that of the present invention, 16 one-input parity circuits, i.e., corresponding to the respective bit lines required in the conventional arrangement can be reduced to four. The parity check circuit can be realized by the same circuit arrangement as in a vertical array parity check scheme. Even if the pitch between adjacent bit lines is reduced, the memory layout can be made easily, and the size of an additional circuit for error correction can be reduced. In addition, the margin of the circuit design for the memory can be increased compared to the conventional memory. Since the horizontal and vertical parity check circuits can be assembled by the same circuit arrangement, high-speed error correction with good speed balance can be achieved. According to the present invention, since the parity check circuits can be driven parallel to the read access in the multiplexer, the signal access time after data has been read out from the cell matrix array can be shortened compared to the conventional memory, thus minimizing a delay in access time.

In the above embodiment, the column decoder is illustrated in the upper portion of the drawing for the sake of simplicity. However, this can be arranged in the memory cell array to be adjacent to the horizontal or vertical array selection switch. Alternatively, the outputs from the upper and lower column decoders are logically ANDed and can be input to the multiplexer as the column decoder output. With this arrangement, a further compact semiconductor memory having the self correction function can be realized.

FIGS. 4 to 5 show another embodiment of the present invention, wherein a single stage of the series-connected parity circuits in the above embodiment is divided into a plurality of stages to realize a further compact and high-speed memory. In this embodiment, for the sake of simplicity, 25 bits of memory cells and 11 bits of parity cells are connected to a single word line. Therefore, the vertical and horizontal arrangement of the memory and parity cells is as shown in FIG. 4A, as a modification of FIG. 1B. More specifically, all the adjacent cells in each area group C1 to C6, C7 to C12, ..., C31 to C36 consisting of six bits belong to different horizontal and vertical arrays. The same reference numerals in FIGS. 4 to 5 denote the same parts or parts having the same functions as in FIG. 3. Outputs H0 to H5 from a lower column decoder 6-1 constituting a column decoder 6 correspond to decode signals for column addresses A0 to A2 and outputs V0 to V5 from an upper column decoder 6-2 correspond to decode signals for column addresses A3 to A5. In FIG. 4, reference numeral 20 denotes a horizontal array parity check circuit; and 21, a vertical array parity check circuit, and the detailed arrangements thereof are shown in FIG. 5. The circuit operation will be described with reference to a case wherein cell data in the cell C8 is to be corrected in FIG. 5.

Cell data in the cells C2, C14, C20, C26, and C32 belonging to the same horizontal array as that of the cell C8 are selected by horizontal array selection switches 10 of a horizontal array selector 18 in response to an output $H_1$ of the lower column decoder 6-1 and are transmitted to nodes N50, N51, N52, N53, N54, and N55, respectively. Similarly, cell data in the cells C3, C13, C24, C29, and C34 belonging to the same vertical array as that of the cell C8 are selected by vertical array selection switches 11 of a vertical array selector 19 in response to an output $V_2$ of the upper column decoder 6-2 and are transmitted to nodes N60, N61, N62, N63, N64, and N65, respectively. The series circuits of one-input parity circuits (transmission exclusive OR gates) 8 are cascade-connected in two stages, as shown in FIG. 5, and a 6-bit horizontal parity check result and a 6-bit vertical parity check result are read out from at nodes N20 and N21 at high speed. The multistage arrangement shown in FIG. 5 is driven at higher speed than a series circuit of a single stage arrangement, and as the number of input bits increases, the effect of the multistage cascade connection is enhanced.

Figure 6:
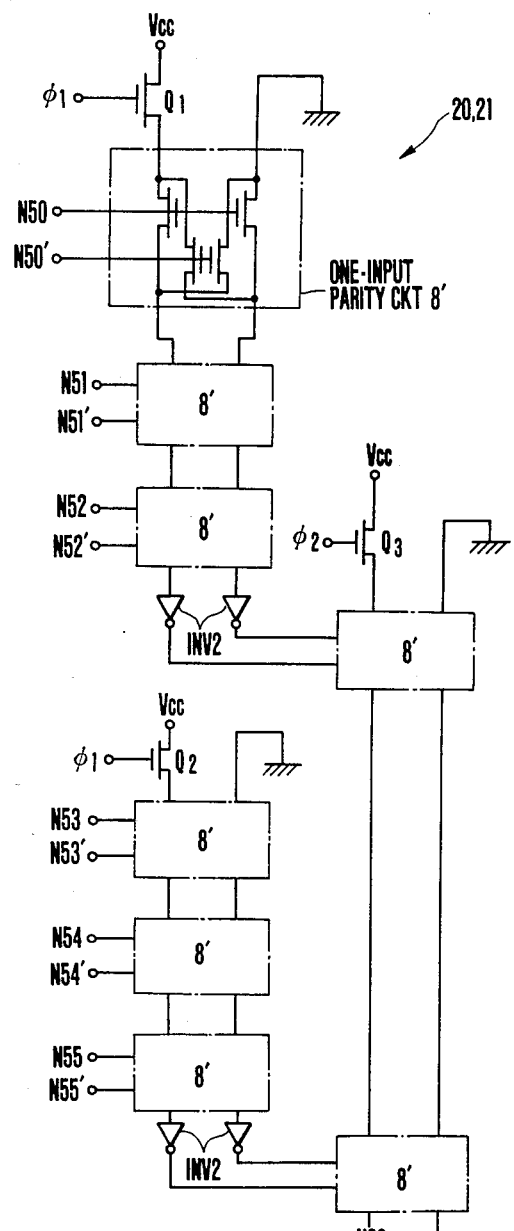

Thereafter, data at a node N23 as an output of a multiplexer 7 is corrected in combination of the data at nodes N20 and N21 and is then supplied to an output terminal. FIG. 6 shows another embodiment of the parity check circuit 20 or 21, i.e., a true/bar type parity check circuit. In FIG. 6, reference symbols $\phi_1$ and $\phi_2$ denote clock input signals, and reference numeral 8' denotes the similar one-input parity circuits as the parity circuits 8, which receive complementary signals from a horizontal or vertical array. In this case, since bit lines in a normal memory are complementary bit line pairs, the arrangement of 8' is adopted in practice rather than 8. Reference symbol INV2 denotes inverters. In this circuit, in a memory standby mode, the clocks $\phi_1$ and $\phi_2$ are at "L" level, transistors Q1, Q2, and Q3 are kept off, and the output nodes of all the circuits 8' are grounded (all nodes N50 to N55 and N50' to N55' are at "H" level). After the complementary signals appear at the nodes N50 to N55 and N50' to N55' during the operation, when the clocks $\phi_1$ and $\phi_2$ go to "H" level from "L" level, the switching operation is initiated, and the 6-bit parity check result appears at the node N20. If the clocks $\phi_1$ and $\phi_2$ are enabled at the same timing, i.e., if the signal $\phi_2$ is the signal $\phi_1$, a slight through current is flowed temporarily. However, if parity check is performed at high speed, the dynamic parity check circuit as above is effective to a memory having a precharge interval, such as a dynamic RAM.

Comparing the arrangements shown in FIGS. 4 to 6 with the conventional arrangement, parity check circuits corresponding to the respective bit lines necessary for horizontal array parity check can be realized by the same circuit arrangement as that of the vertical array parity check circuit. If a pitch between adjacent bit lines is reduced, a layout can be easily made and the size of the additional circuit for error correction can be reduced. In addition, horizontal and vertical parity check can be achieved by the same circuit arrangement, and the parity check circuits can be realized by cascade-connecting a plurality of stages of the parity circuits, thus allowing high-speed error correction with good speed balance. In particular, when compared with a case wherein a single stage of the series-connected parity circuits is used, the operation time of the parity check circuit can be shortened. As the number of parity bits increases, this effect can be further enhanced.

FIGS. 7 to 10 show still another embodiment of the present invention, in which an initial setting function is provided to greatly reduce an initialization time of memory cells and parity cells.

Figures 7, 7B:
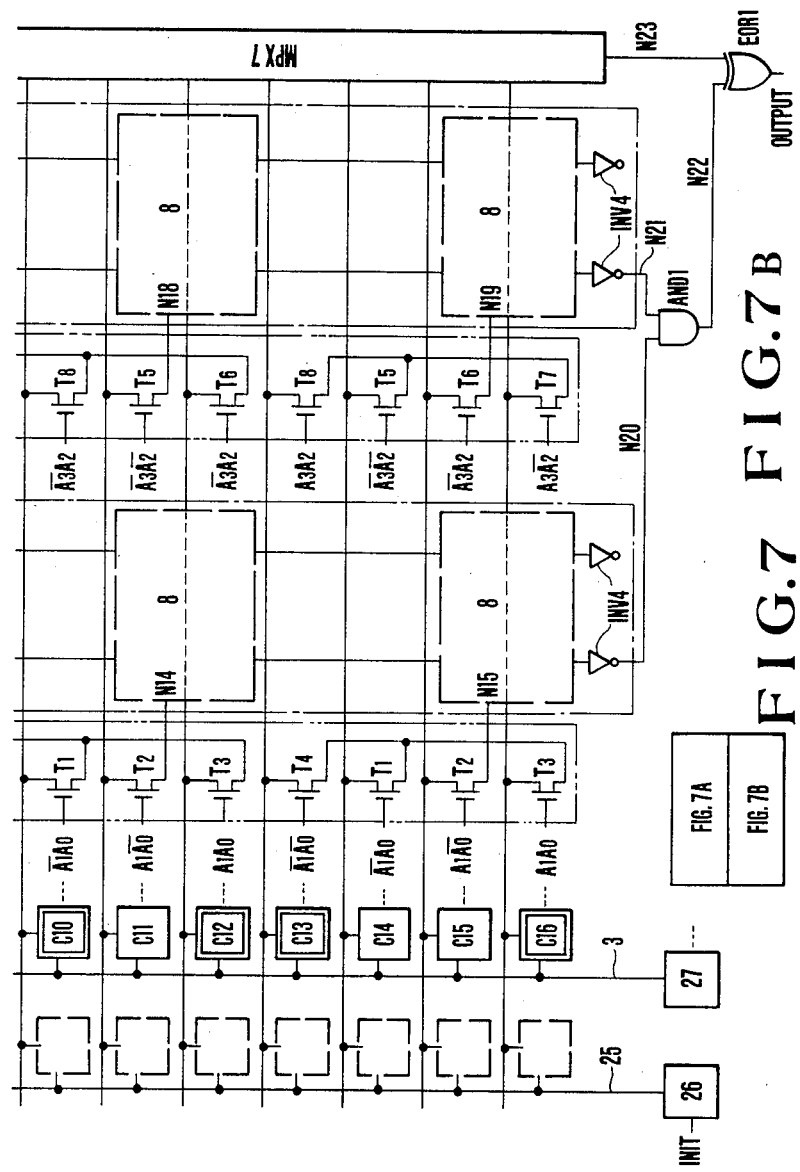
FIG. 7 (7A and 7B) is a circuit diagram showing still another embodiment of the present invention.

FIG. 7 shows the basic circuit arrangement. The same reference numerals in FIG. 7 denote the same parts as in FIGS. 2. In FIG. 7, reference numeral 24 denotes initial condition setting ROM cells; 25, a word line for the ROM cells; 26, a word line driver for driving the word line 25 for the ROM cells; and 27, a word driver for driving normal word lines. The ROM cells 24 are connected to the word line 25, and are also connected to bit lines 4 of respective memory cells 1. Parity circuits 8 or 8' used in this embodiment are parity circuits enabled by clock signals $\phi_1$ and $\phi_2$, as shown in FIG. 6, and each has one input. In this case, the parity circuit 8 is a one-input type which receives only a true signal and the parity circuit 8' may be a one-input parity circuit which receives true/bar complementary signals. Further, the parity circuit 8 may be changed to the parity circuit 8'.

A data initial setting operation with the above arrangement will now be described. FIG. 8 is a timing chart, in which when an initialization selection signal INIT is at "H" level, an initialization mode is set, and when it is at "L" level, a normal mode is set. When a reference clock signal $\overline{RAS}$ for a row system is at "L" level, the memory is activated. This timing chart is for exemplifying a case wherein after a row address is updated to i, i+1, and i+2 in the initialization mode, the row address i is accessed in the normal mode. Reference numerals $3_i$, $3_{i+1}$, and $3_{i+2}$ denote word lines corresponding to the respective row addresses. Initialization can be made for some or all of row addresses. FIGS. 9 and 10 show circuits of the word driver 26 for the ROM cells 24 and the word driver 27 for the memory cells 1. When the initialization selection signal INIT is at "H" level, a word line 3 for the selected memory cells 1 is activated, and the word line 25 is also activated. Therefore, upon activation of the word line 25 for the ROM cells 24, "0" stack data in the ROM cells 24 is stored in all the memory cells 1 and parity cells 2 along the single word line 3 via the bit lines 4 and parity bit lines 5, as shown in FIG. 7. In the normal mode, the signal INIT is not supplied to the driver 26 and the word line 25 is not activated, thus performing a normal memory operation. With this arrangement, since all the memory cells and parity cells along the word lines can be initialized in one cycle, an initialization time can be greatly shortened as compared with conventional bit-by-bit initialization. (Assuming that the memory has a 16-M size and a cycle time of 1 $\mu$s, initialization takes 4 ns which is reduced to 1/4,000 that of the conventional memory, 16 sec.). The arrangement of this embodiment can comprise a ROM cell storing "1" stack data in addition to the ROM cells 24 storing "0" stack data, and when a desired ROM cell pattern is provided, desired initialization data can be written at high speed. Note that the signal INIT supplied to the word driver 26 for the ROM cells can be externally input or be internally generated. For example, if the signal INIT is internally generated, when it is set at "L" level, an initialization mode for setting a R/W signal at "L" level in a CAS before RAS refresh mode as a normal RAM refresh mode is set, and when it is set at "H" level, a refresh mode is set. For initialization, when a plurality of word lines are simultaneously activated, cells can be initialized at the same time. In the case of FIG. 7, bit line data is selected by the horizontal and vertical array selectors 18 and 19 and is then input to the one-input parity circuits 8. However, when signals representing bit line pairs used in a normal RAM are selected to be input to the one-input parity circuits, an inverter (INV1 in FIG. 7) can be omitted, or the parity circuits 8' receiving the true/bar signal can be adopted. In addition, as for the circuit arrangement of the selectors, when data of the bit line pairs are received by gates, the bit line capacity can be reduced.

Furthermore, the above description has been made in terms of a dynamic RAM. However, the present invention can be similarly applied to a static RAM, as a matter of course.

Figures 11, 11A:
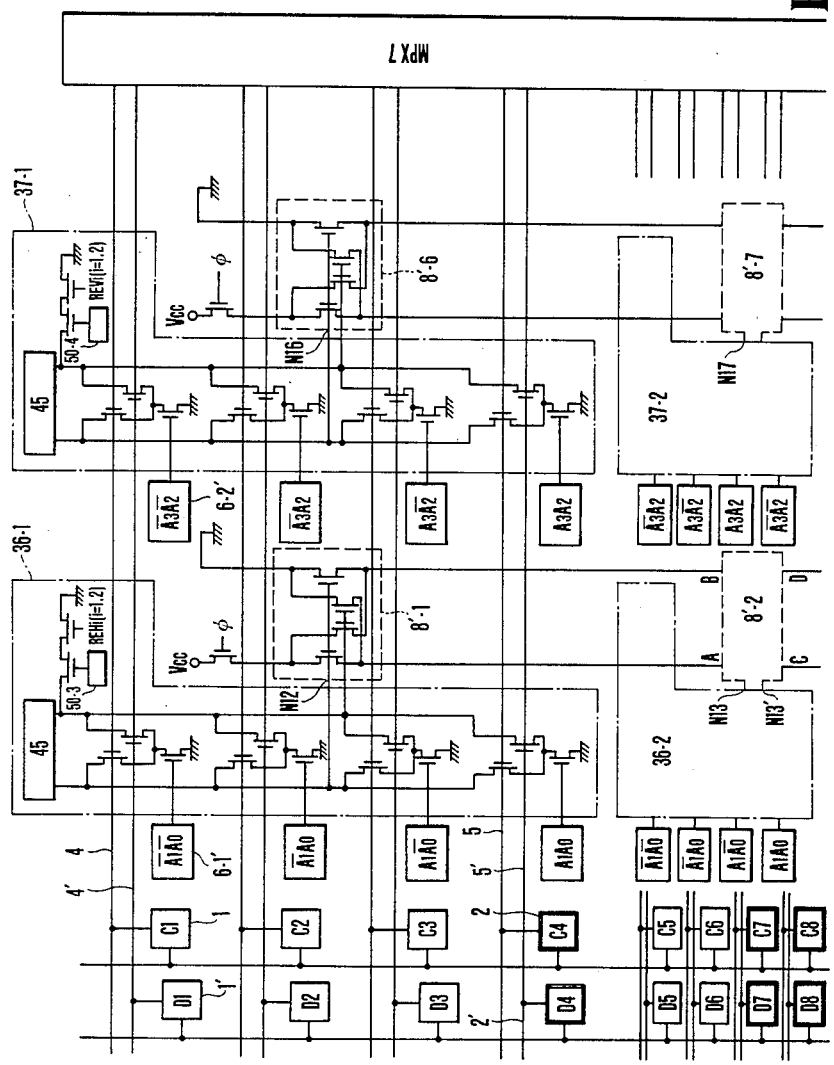
FIG. 11 (11A and 11B) is a circuit diagram showing still another embodiment of the present invention.

FIGS. 11 to 17 show still another embodiment of the present invention, in which defects of column system circuits in addition to random defects of cells can be corrected by adding auxiliary or surplus bit lines. The same reference numerals in FIG. 11 denote the same parts or functions as in FIG. 3. In FIG. 11, taking true and bar signals (meaning complementary signals) as a normal memory arrangement into consideration, the circuit utilizes the complementary signals appearing on the bit lines 4 (or 5) and 4' (or 5'). Reference numerals 1' denote dummy memory cells; 2', dummy parity cells; 3', dummy word lines; 4', one bit line of each bit line pair combined with a bit line and 5', one parity bit line of each parity bit line pair combined with a parity bit line 5. In practice, memory cells are arranged on a two-dimensional array together with parity cells. Reference numerals 6-1' and 6-2' indicate lower column decoders and upper column decoders as a part of a column decoder, respectively, and addresses after decoding are indicated inside the blocks. The addresses after the lower column decoding are circulated every four bits, and the addresses after upper column decoding are circulated every four bits by one bit. With this decode signal, a selector selection logic shown in FIG. 11 can be established.

For the sake of simplicity, the respective components are input to a horizontal array selector 36 (36-1 to 36-4) and a vertical array selector 37 (37-1 to 37-4). However, an AND signal of a lower column decoder output and an upper column decoder output corresponding to an identical bit line pair is normally input to a multiplexer 7 as a column decode signal. (This also applies to surplus cells). Reference numerals 44 and 44' denote surplus bit line pairs; RC1 and RC2, surplus cells; RD1 and RD2, surplus dummy cells; 45, a precharge circuit; 48, a horizontal array surplus selector; 49, a vertical array surplus selector; 50-1, components of lower surplus column decoders; 50-2, components of upper surplus column decoders; and 50-3 and 50-4, circuit components for defect separation. Reference numeral 8' (8'-1 to 8'-10) denotes the same one-input parity circuits as the parity circuits 8, except that they are of true/bar input type. FIG. 12 shows the components of the lower (upper) surplus column decoders (50-1 and 50-2) and FIG. 13 shows the components of the lower (upper) column decoders, in which reference numerals 51 and 52 denote program elements which are electrically broken and turned off, or are broken and turned off by laser, or are latched in a circuit manner to be electrically turned off. When a desired program element 51 corresponding to a defect address is turned off, a lower (upper) column address having a defect can be registered in the surplus column decoder. When a desired program element 52 is turned off, a lower (upper) column decoder output having a defect can be fixed at "L" level.

Figures 15, 16:
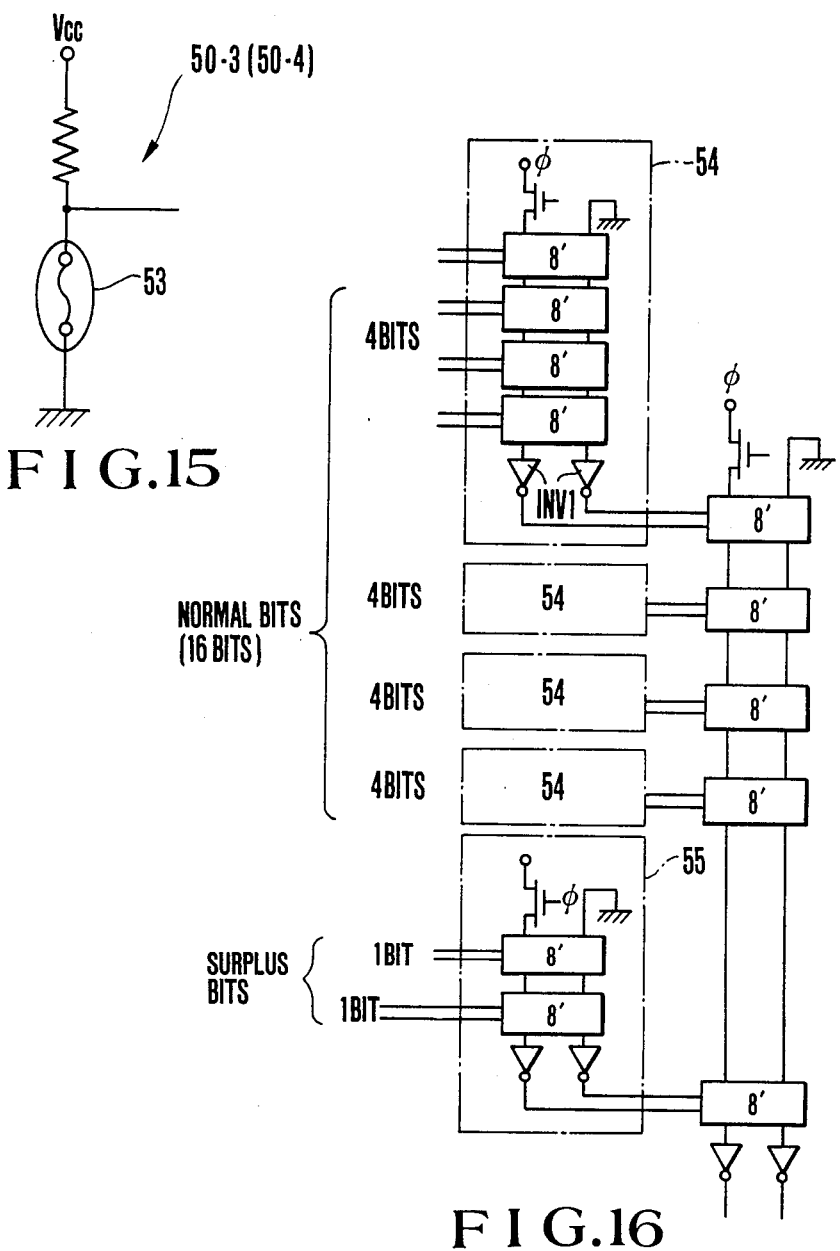
FIG. 15 shows circuit components for error separation used in FIG. 11.
FIG. 16 is a circuit diagram showing a high-speed parity check circuit.

Note that reference symbol $\overline{CAS}$ indicates a precharge clock. Therefore, data in a cell having a defect is not output, and data stored in the surplus cell is output instead thereof. FIG. 14 shows a generator for generating defect separation signals $REH_i$ and $REV_i$ (i is 1 or 2) and surplus selector activation signals $\overline{REH}_i$ and $\overline{REV}_i$. In this embodiment, two pairs of surplus bit lines are adopted. When an externally input lower (upper) column address coincides with a defect lower (upper) column address, the signal $REH_i$ ($REV_i$) goes to "H" level (or signal $\overline{REH}_i$ ($\overline{REV}_i$) goes to "L" level). (Otherwise, they are in the reverse state). FIG. 15 shows circuit components for defect separation indicated by reference numerals 50-3 and 50-4 in FIG. 11. When program elements 53, similar to the program elements 51 and 52, in the horizontal and vertical array selectors to which the bit line having a defect belongs are turned off, "H"-level signals are generated.

The operation will now be described with reference to cases (i) wherein when the content of a memory cell C6 is read out, the cell C6 itself is a defect bit and data $\overline{A1A0}$ and $A3\overline{A2}$ are registered in 50-1' and 50-2' to replace the cell C6 with the surplus cell RC1 and (ii) wherein a cell C10 belonging to the same horizontal array as the cell C6 is a defect bit and data $\overline{A1}A0$ and $A3\overline{A2}$ are respectively registered in 50-1' and 50-2' in order to replace the cell C10 with the surplus cell RC1. (Therefore, the defect separation signals are $REH_1$ and $REV_1$ and the surplus selector activation signals are $\overline{REH}_1$ and $\overline{REV}_1$). In the case of (i), the upper and lower column decoders 6-1' and 6-2' corresponding to the cell C6 are fixed at "L" level since the program element 52 is turned off. Since the program element 51 is turned off, the signals $REH_1$ and $REV_1$ are at "H" level and the signals $\overline{REH}_1$ and $\overline{REV}_1$ are at "L" level. When only the outputs of the circuit components 50-3 and 50-4 for defect separation in the horizontal and vertical array selectors 36-2 and 37-2, to which the bit line pair connected to the cell C6 belongs, turn off the program elements 53, the outputs therefrom are fixed at "H" level. From these states, bit data associated with a cell C2 appears at a node N12, "H" fixed data appears at a node N13 since bit data associated with the cell C6 is separated, bit data associated with a cell C10 appears at a node N14, bit data associated with a cell C14 appears at a node N15, and bit data associated with the cell RC1 appears at a node N30, respectively. When the clock $\phi$ rises, the horizontal array parity check circuit consisting of the parity circuits 8'-1 to 8'-10 is driven. At this time, since the node N13 is fixed at "H" level and the corresponding node N13' is fixed at "L" level, inputs signals A and B to the one-input parity circuit 8'-2 are sent to the downstream one-input parity circuit as output signals C and D. When viewed from a node N20, 4-bit parity data at the nodes N12, N14, N15, and N30 appears. This means that surplus bit data in the cell RC1 belongs to the horizontal array area group in place of the bit data in the cell C6. Similarly, bit data associated with a cell C3 appears at a node N16, "H" fixed data appears at a node N17, bit data associated with a cell C9 appears at a node N18, bit data associated with a cell C16 appears at a node N19, and bit data associated with the cell RC1 appears at a node N31. Thus, 4-bit parity data at the nodes N16, N17, N19, and N31 can be obtained. Therefore, a correction signal appears at a node N22, and surplus cell data in the cell RC1 in place of the cell C6, which is selected by the multiplexer 7, is corrected and output if a node N22 is at "H" level.

In the case of (ii), the outputs of the lower and upper column decoders 6-1' and 6-2' corresponding to the cell C10 are fixed at "L" level since the program element 52 is turned off. However, the accessed cell is the cell C6 and its lower column address $\overline{A1A0}$ is the same as that of the cell C10. Therefore, since the defect cell is present in the horizontal direction, the signal $REH_1$ goes to "H" level and the signal $\overline{REH}_1$ goes to "L" level, and since no defect cell is present in the vertical direction, the signal $REV_1$ goes to "L" level and the signal $\overline{REV}_1$ goes to "H" level. When the outputs of the circuit components 50-3 and 50-4 for defect separation in the horizontal and vertical array selectors 36-3 and 37-3, to which the bit line pair, connected to the cell C10, belongs, turn off the program elements 53, the outputs therefrom are fixed at "H" level. From these states, bit data associated with the cell C2 appears at the node N12, bit data associated with the cell C6 appears at the node N13, "H" fixed data appears at the node N14 since bit data associated with the cell C10 is separated, bit data associated with the cell C14 appears at the node N15, and bit data associated with the cell RC1 appears at the node N30. When the clock $\phi$ rises, the horizontal array parity check circuit consisting of the parity circuits 8'-1 to 8'-5 is driven. At this time, the one-input parity circuit 8'-3 connected to the node N14 is operated in the same manner as the parity circuit 8'-2 in the case of (i). When viewed from the node N20, 4-bit parity at the nodes N12, N13, N15, and N30 appears. This means that surplus bit data in the cell RC1 in place of the bit data in the cell C10 belongs to the horizontal array area group. On the other hand, bit data associated with the cell C3 appears at the node N16, bit data associated with the cell C6 appears at the node N17, bit data associated with the cell C9 appears at the node N18, bit data associated with the cell C16 appears at the node N19, and "H" fixed data appears at the node N31 since the signal $REV_1$ is at "H" level. Thus, 4-bit parity at the nodes N16, N17, N18, and N19 appears at the node N21 of the vertical array selector. Therefore, a correction signal corresponding to the cell C6 reflecting the horizontal array parity check result in which the data in the cell C10 is replaced with that in the cell RC1 appears at the node N22. Thus, the data in the cell C6 from the multiplexer 7 is corrected by the correction signal at the node N22 and is then output. In this manner, the outputs of the upper and lower column decoders corresponding to the defect bit line pair are set at "L" level, the upper column and lower column addresses corresponding to the defect bit address pair are registered in the upper and lower column decoders corresponding to the surplus bit line pair, and the program elements of the circuit components for defect separation in the horizontal and vertical array selectors to which the defect bit line pair belongs are turned off. In this manner, even if any memory cell including the surplus cells is accessed, an error correction function can be similarly realized. If a plurality of pairs of surplus bit lines are used, the signals $REH_i$, $\overline{REH}_i$, $REV_i$, and $\overline{REV}_i$ and the circuit elements 50-3 and 50-4 for defect separation can be prepared corresponding to the number of pairs of the surplus bit lines. For example, as shown in FIG. 11, when two pairs of surplus bit lines are used, the signals $REH_1$, $REH_2$, $\overline{REH}_1$, $\overline{REH}_2$, $REV_1$, $REV_2$, $\overline{REV}_1$, and $\overline{REV}_2$ and circuit components 50-1 and 50-2 including transistors can be prepared. FIG. 16 shows a 17-bit parity check circuit required when a data bit length corresponds to 256 bits and a parity bit length corresponds to 33 bits which are assumed to be used in practice, wherein two stages of parity check circuits are cascade-connected and acceleration circuits (inverters in FIG. 16) are inserted at connecting portions, thus allowing a high-speed operation. As indicated by blocks 54 and 55 in FIG. 16, if an input method of a surplus bit and normal bits and the number of stages of series-connected one-input parity circuits are set properly, a delay time due to insertion of the one-input parity circuit for the surplus bit can be eliminated. (That is, in FIG. 16, if the surplus bit is added or not, a time required for parity check remains the same.) Therefore, an on-chip error correction circuit including a surplus bit line can be realized without a delayed error correction time.

FIG. 17 shows still another embodiment of the present invention, wherein surplus cells and surplus bit lines are provided in units of bits constituting one horizontal or vertical array area group. In this embodiment, a pair of surplus bit lines are added to four pairs of bit lines as indicated by a block 56, and surplus selectors (36′ and 37′) are accommodated in selectors in both the horizontal and vertical arrays. With this arrangement, circuit components 50-3 and 50-4 for defect separation necessary in the embodiment shown in FIG. 11 can be omitted, and the defect bit line pair can be switched to the surplus bit line pair only by turning off program elements of the upper and lower column decoders and the surplus upper and lower column decoders corresponding to the defect column address.

For write access in a self correction memory as in the present invention, only two data in parity cells of horizontal and vertical arrays to which a memory cell to be write-accessed need be updated. In an actual memory, since adjacent memory cells and parity cells are arranged to belong to different code area groups, a cell belonging to a different code area group is, for example, present between the cells C1 and C2 in FIG. 11, as described in U.S. Pat. No. 4,456,980. Therefore, even if an error occurs in adjacent two bits, they can be corrected by different correction codes.

Figure 18A:
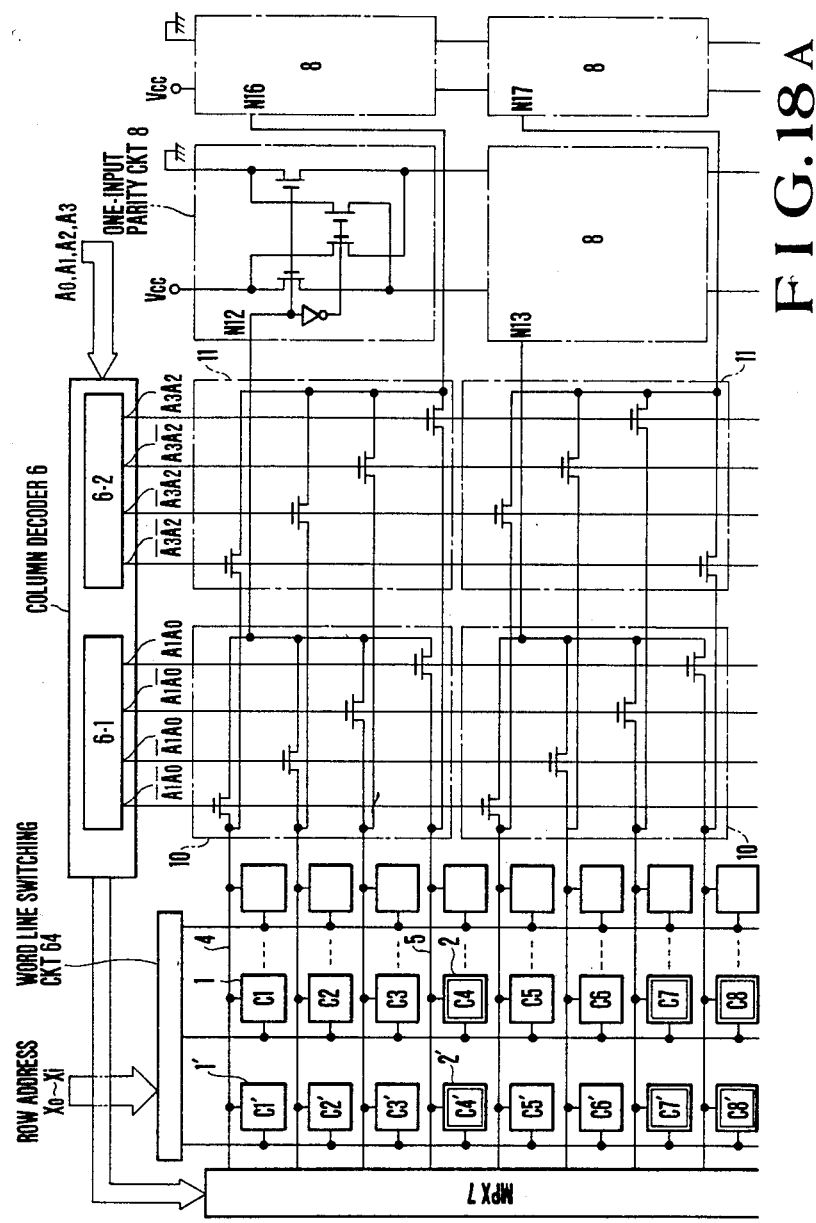
FIGS. 18 to 20 (18A, 18B, 19A, 19B, 20A and 20B) are circuit diagrams showing other embodiments of the present invention.
Figures 18, 18B:
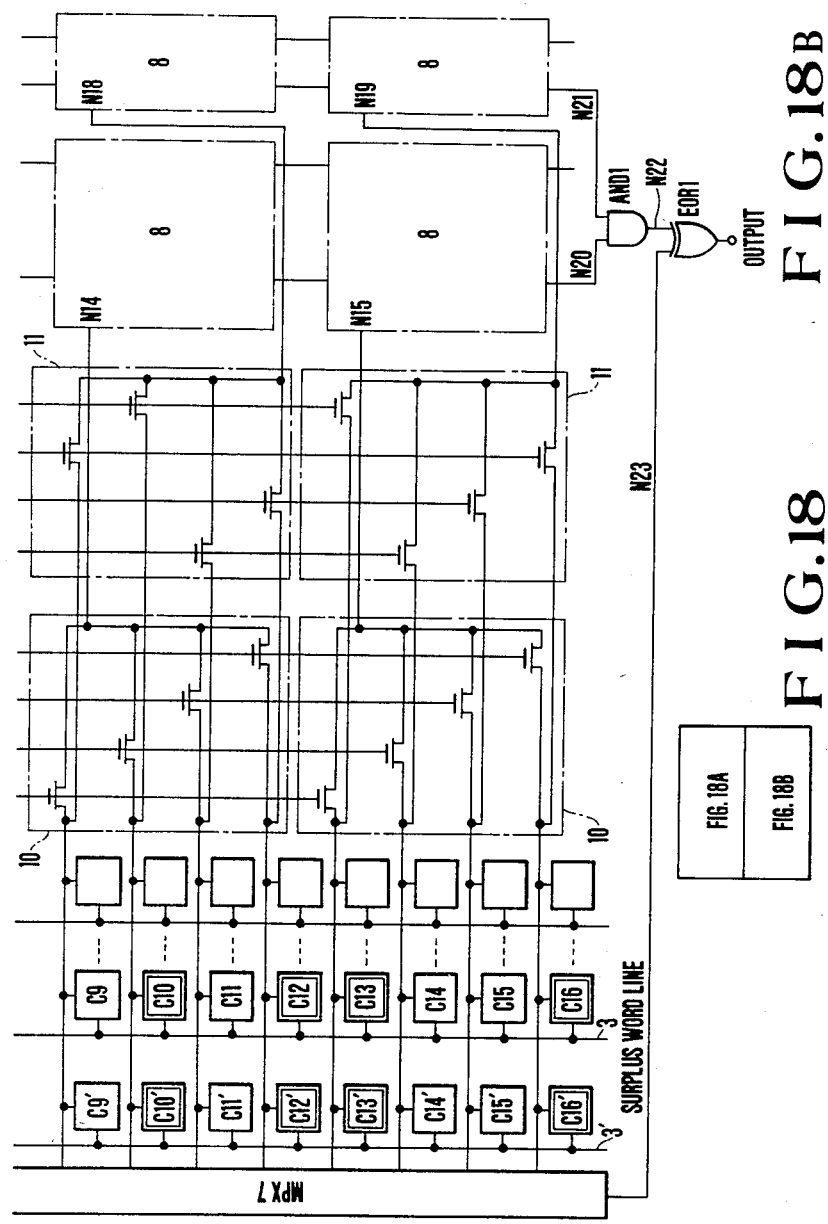

FIG. 18 shows still another embodiment of the present invention, in which defects in row system circuits can be corrected in addition to random defects in cells by adding surplus word lines. The same reference numerals in FIG. 18 denote the same parts or functions as in FIG. 3. Referring to FIG. 18, reference numeral 1′ denotes surplus memory cells; 2′, surplus parity cells; 3′, a surplus word line; 64, a word line switching circuit; and $X_0$ to $X_i$, row addresses.

The operation of this embodiment is as follows. For example, an address of a defect word line discriminated during the test in its manufacture is registered in the word line switching circuit 64 by means of, e.g., a laser program or electrical fuse, and coincidence/noncoincidence between an externally supplied row address ($X_0$ to $X_i$) and the registered defect word line address is checked. If a coincidence is found therebetween, the surplus word line 3′ is selected in place of the defect word line, thus performing a normal memory operation. Since defect correction by means of the surplus word line 3′ does not degrade the error correction function of the present invention and its speed performance, a semiconductor memory with high reliability and high yield can be realized by the defect correction function and the error correction function.

Figure 19B:
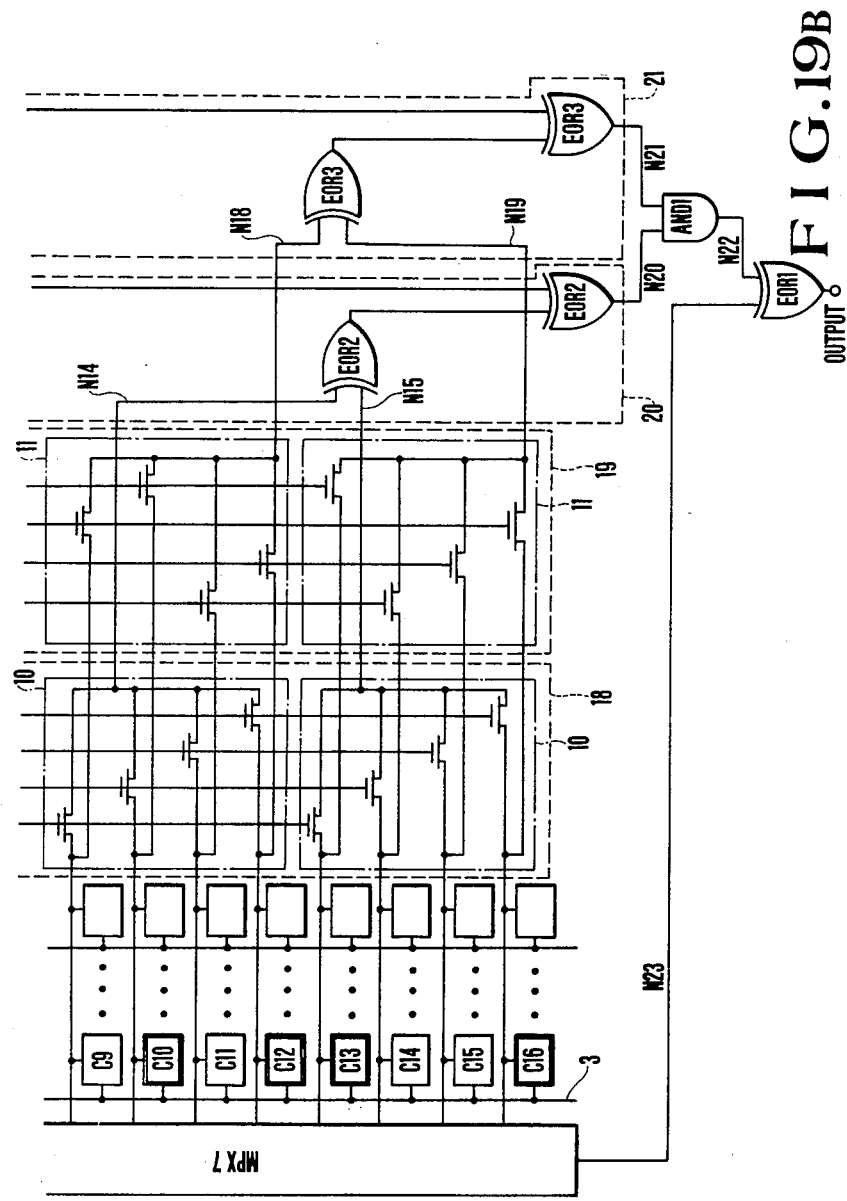

FIG. 19 shows still another embodiment of the present invention, wherein a plurality of conventional two-input or four-input exclusive OR gates are connected in place of the transmission type exclusive OR gates used in the above embodiment to constitute parity check circuits. The same reference numerals in FIG. 19 denote the same parts or functions as in FIG. 3. In FIG. 19, reference symbols EOR2 and EOR3 denote exclusive OR gates similar to EOR1. A horizontal array parity check circuit 20 is constituted by three exclusive OR gates EOR2, and a vertical array parity check circuit 21 is constituted by three exclusive OR gates EOR3.

With this arrangement, the circuit operation will be described with reference to a case wherein cell data in a cell C6 is to be corrected. Cell data in cells C2, C10, and C14 belonging to the same horizontal array as that of the cell C6 are selected by a horizontal array selection switch 10 in response to an output $\overline{A1A0}$ of a lower column decoder 6-1 and are transmitted to nodes N12, N13, N14, and N15, respectively. Similarly, cell data in cells C3, C9, and C16 belonging to the same vertical array as that of the cell C6 are selected by a vertical array selection switch 11 in response to an output $\overline{A3A2}$ of an upper column decoder 6-2 and are transmitted to nodes N16, N17, N18, and N19, respectively. Thereafter, horizontal array parity check and vertical array parity check are similarly performed by a series circuit of two-input EOR gates EOR2 in the vertical array parity check circuit 20 and a series circuit of two-input EOR gates EOR3 in the vertical array parity check circuit 21. The outputs of the EOR gates EOR2 and EOR3 appear at nodes N20 and N21, and are logically ANDed by an AND gate AND1. Data at a node N23 as the output of a multiplexer 7 is corrected by the combination of the parity check results appearing at a node N22 and is supplied to an output terminal through an EOR gate EOR1. Comparing the arrangement of this embodiment with the conventional arrangement, 16 one-input parity circuits, i.e., corresponding to respective bit lines can be omitted, and vertical and horizontal array parity check operations can be performed each by three two-input EOR gates which are normally used. If a pitch between adjacent bit lines is reduced, a layout can be easily made, thus reducing the size of an additional circuit for error correction. In addition, since the parity check operations are performed by the same parity check circuits in the vertical and horizontal directions, high-speed error correction with good speed balance can be achieved.

Figure 20:
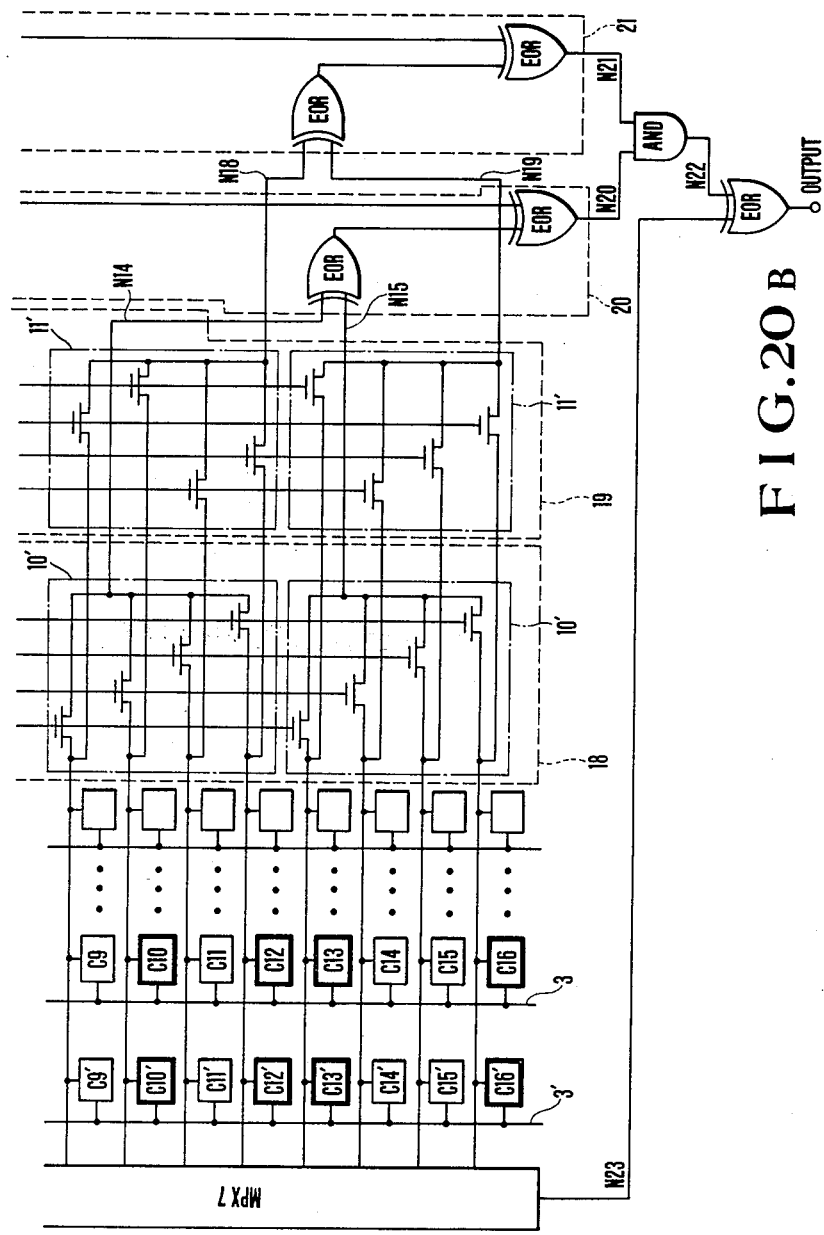

FIG. 20 shows still another embodiment of the present invention, in which a surplus word line 3′, surplus memory cells 1′, surplus parity cells 2′, and a word switching circuit 64 are added in the embodiment shown in FIG. 19. In FIG. 20, reference symbols $X_0$ to $X_i$ indicate row addresses, and C1′ to C16′ respectively correspond to C1 to C16. This arrangement adopts a redundancy arrangement by means of surplus word line replacement for improving the manufacturing yield. For example, the address of a defect word line discriminated during the test in the manufacture is registered in the word line switching circuit 64 by means of, e.g., a laser program or electrical fuse. When the memory is used, coincidence/noncoincidence between an externally supplied row address ($X_0$ to $X_i$) and the registered defect word line address is checked. If a coincidence is found, the surplus word line is selected in place of the defect word line, thus performing a normal memory operation. Since defect correction by means of the surplus word line does not degrade the error correction function of the present invention and its speed performance, a semiconductor memory with high reliability

What is claimed is:

1. A semiconductor memory having a self correction function, comprising:
   a matrix of cells divided into a plurality of area groups, each of which consists of physically adjacent memory cells and parity cells for forming horizontal and vertical parity codes together with the data in said memory cells, each cell of said area groups being arrayed so as not to belong to the same horizontal and vertical arrays for said horizontal and vertical parity codes;
   a word line for simultaneously selecting said cells;
   a plurality of bit lines for exchanging data with said cells;
   a horizontal selector means associated with each area group for selecting data of the horizontal group to which a memory cell to be checked belongs through said bit lines;
   a vertical selector means associated with each group for selecting data of the vertical group to which a memory cell to be checked belongs through said bit lines;
   means coupled to the outputs of said horizontal and vertical selector means for performing a parity check of the output data of said horizontal and vertical selectors; and
   means for automatically correcting a bit error using the output from said parity check means.

2. A semiconductor memory according to claim 1, wherein said parity check means comprises a horizontal array parity check circuit and a vertical array parity check circuit, and said circuits have the same circuit arrangement.

3. A semiconductor memory according to claim 2, wherein said parity check means comprises one-input parity circuits.

4. A semiconductor memory according to claim 2, wherein said parity check means comprises exclusive OR gates.

5. A semiconductor memory according to claim 1, wherein said parity check means comprises parity circuits corresponding to said area groups, and said parity circuits are series-connected.

6. A semiconductor memory according to claim 1, wherein said parity check means comprises one-input parity circuits corresponding to said area groups, and a plurality of stages of series circuits of said parity circuits are cascade-connected.

7. A semiconductor memory according to claim 1, wherein each of said parity circuits has a true/bar type circuit arrangement, and a final stage output of the series-connected parity circuits is connected to the series-connected parity circuits at the next stage.

8. A semiconductor memory according to claim 6, wherein said plurality of stages of series-connected parity circuits are excited by a single clock.

9. A semiconductor memory according to claim 1, further comprising:
   a plurality of memory cells, arranged in correspondence with said memory cells and said parity cells, for setting an initial condition;
   another word line connected to said initial setting memory cells; and
   means, connected to said another word line, for driving said initial setting memory cells during initial setting,
   wherein said initial setting memory cells are connected to said bit lines of the corresponding memory cells and parity cells.

10. A semiconductor memory according to claim 1, further comprising:
    surplus bit lines arranged in addition to said parity bit lines;
    surplus cells connected to said surplus bit lines and said word lines; and
    control means for replacing the memory cell or parity cell having a defect with a surplus cell connected to the corresponding surplus bit line.

11. A semiconductor memory according to claim 10, wherein said control means has a function for programmably registering a column selection address of said horizontal array and vertical array selectors as a defect address.

12. A semiconductor memory according to claim 11, further having defect separation means for disabling a check function of the parity circuit to which the memory cell or parity cell having a defect belongs, and means for enabling the surplus bit line of the replacing surplus cell.

13. A semiconductor memory according to claim 10, wherein said selector means further include defect separation means for disabling a check function of the parity circuit to which the memory cell or parity cell having a defect belongs, and means for enabling the surplus bit line of the replacing surplus cell.

14. A semiconductor memory according to claim 10, further comprising:
    a plurality of surplus memory cells connected to said bit lines corresponding to said memory cells;
    a plurality of surplus parity cells connected to said parity bit lines corresponding to said parity cells;
    a surplus word line for selecting said memory cells and said surplus parity cells; and
    control means for replacing a defect word line of said word lines with said surplus word line.

* * * * *